United States Patent [19]
Namekata

[11] Patent Number: 5,579,344
[45] Date of Patent: Nov. 26, 1996

[54] ADAPTIVE MAXIMUM LIKELIHOOD SEQUENCE ESTIMATION APPARATUS AND ADAPTIVE MAXIMUM LIKELIHOOD SEQUENCE ESTIMATION METHOD

[75] Inventor: Minoru Namekata, Tokyo, Japan

[73] Assignee: Kabushiki Kaisha Toshiba, Kawasaki, Japan

[21] Appl. No.: 557,930

[22] Filed: Nov. 14, 1995

Related U.S. Application Data

[63] Continuation of Ser. No. 308,423, Sep. 19, 1994, abandoned.

[30] Foreign Application Priority Data

Sep. 20, 1993 [JP] Japan ..................... 5-232878

[51] Int. Cl.⁶ .................................. H01L 27/06
[52] U.S. Cl. ............... 375/341; 375/232; 375/346
[58] Field of Search ........................ 375/232, 286, 375/290, 340, 341, 344, 346, 348, 350; 371/43; 364/724.2; 333/18, 28 R

[56] References Cited

U.S. PATENT DOCUMENTS

| | | | |
|---|---|---|---|
| 5,068,873 | 11/1991 | Murakami | 375/231 |
| 5,081,651 | 1/1992 | Kubo | 375/341 |
| 5,204,878 | 4/1993 | Langson | 375/232 |
| 5,272,726 | 12/1993 | Furuya et al. | 375/341 |
| 5,272,727 | 12/1993 | Okanoue | 375/341 |
| 5,297,169 | 3/1994 | Backström et al. | 375/231 |
| 5,303,263 | 4/1994 | Shoji | 375/229 |
| 5,353,307 | 10/1994 | Lester et al. | 375/233 |

FOREIGN PATENT DOCUMENTS 53438  1/1993  Japan .

*Primary Examiner*—Young T. Tse
*Attorney, Agent, or Firm*—Oblon, Spivak, McClelland, Maier & Neustadt, P.C.

[57] ABSTRACT

An adaptive maximum likelihood sequence estimation apparatus includes a first estimation unit for estimating a transmission signal sequence from received signals on the basis of an estimated transmission path impulse response. A second estimation unit estimates an estimated received signal at time k on the basis of a known signal sequence or the transmission signal sequence estimated by the first estimation unit, and a transmission path impulse response estimated at time k–1. An error signal generation unit generates an error signal on the basis of a received signal at time k and the estimated received signal at time k. A third estimation unit estimates a transmission path impulse response at time k using a predetermined adaptive algorithm on the basis of the error signal. Furthermore, the third estimation unit estimates a transmission path impulse response by a non-recursive calculation during the reception period of a known signal sequence of the received signal, and estimates a transmission path impulse response by a recursive calculation during the reception period of an unknown data signal sequence of the received signals following the known signal sequence period.

14 Claims, 14 Drawing Sheets

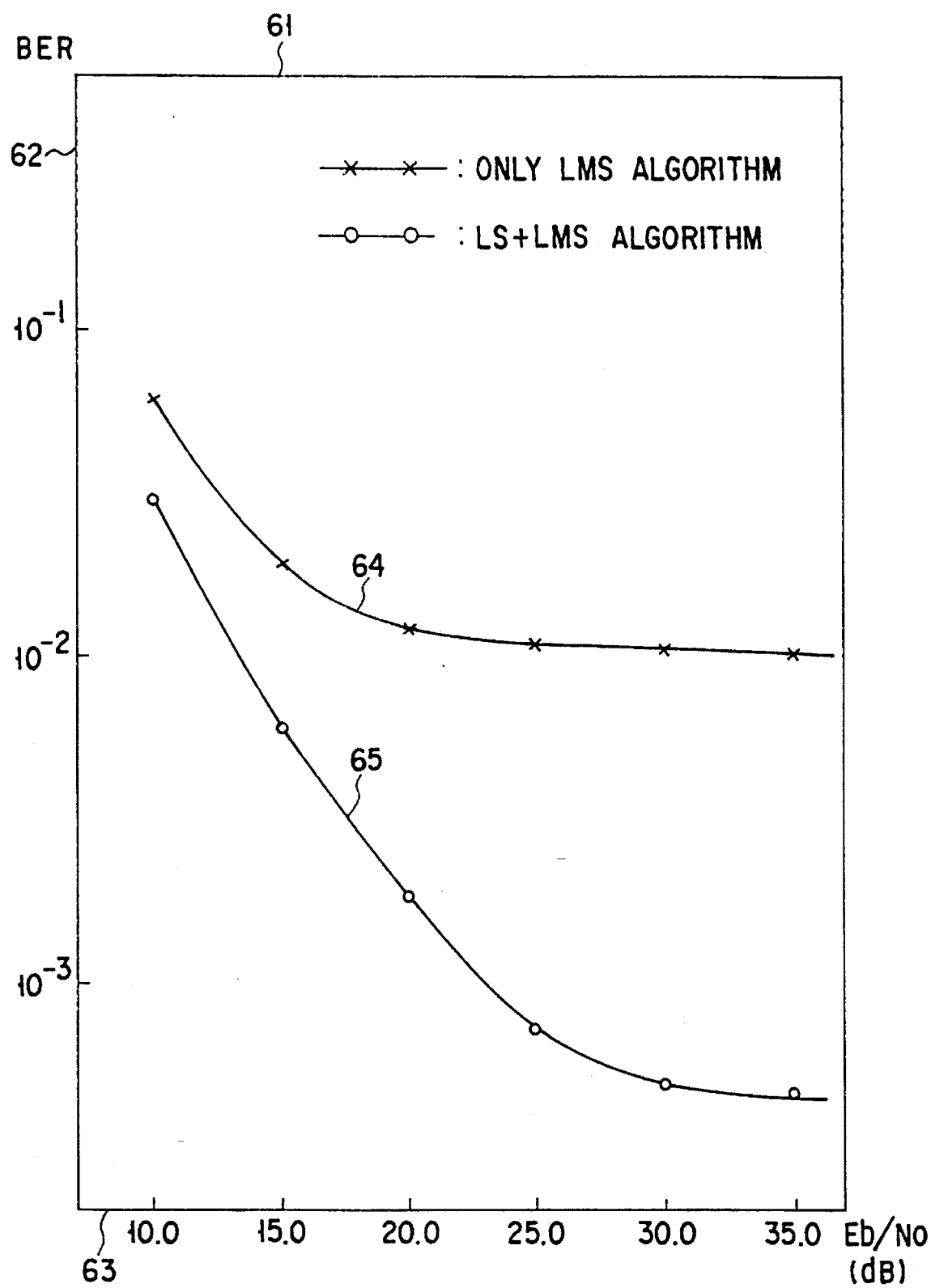
F I G. 6

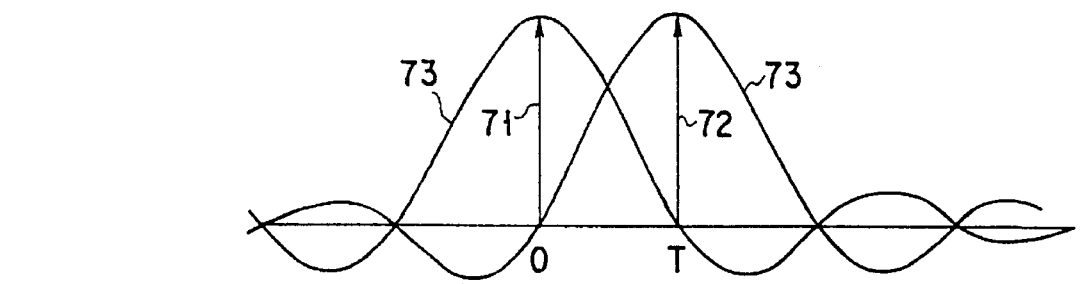
F I G. 7A
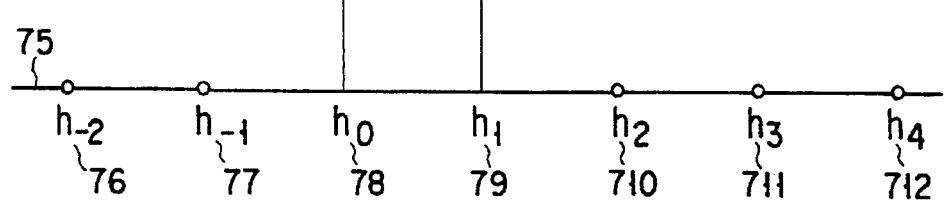
F I G. 7B
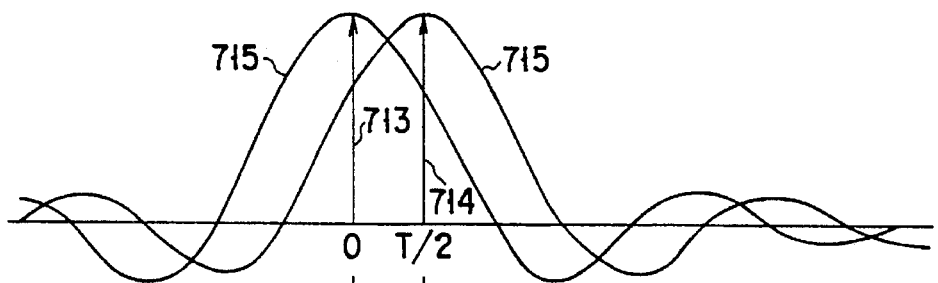
F I G. 7C
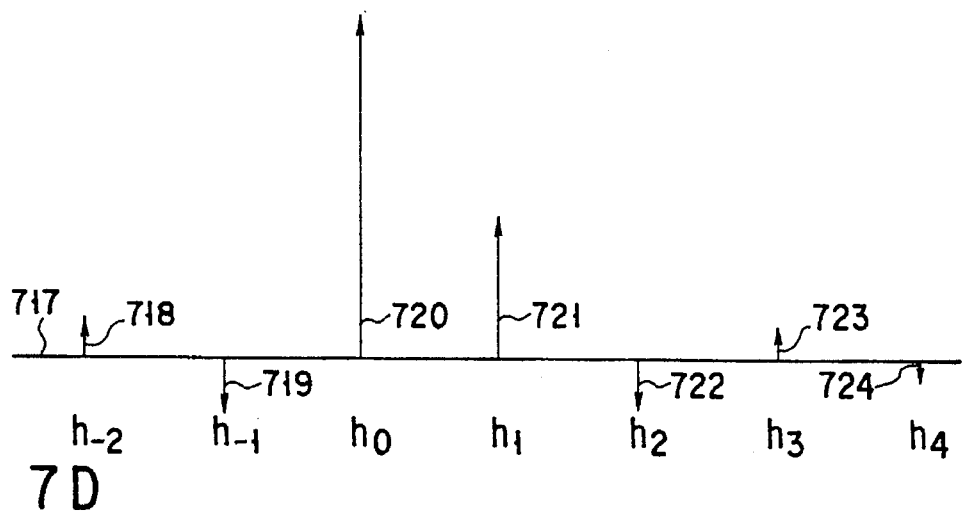
F I G. 7D

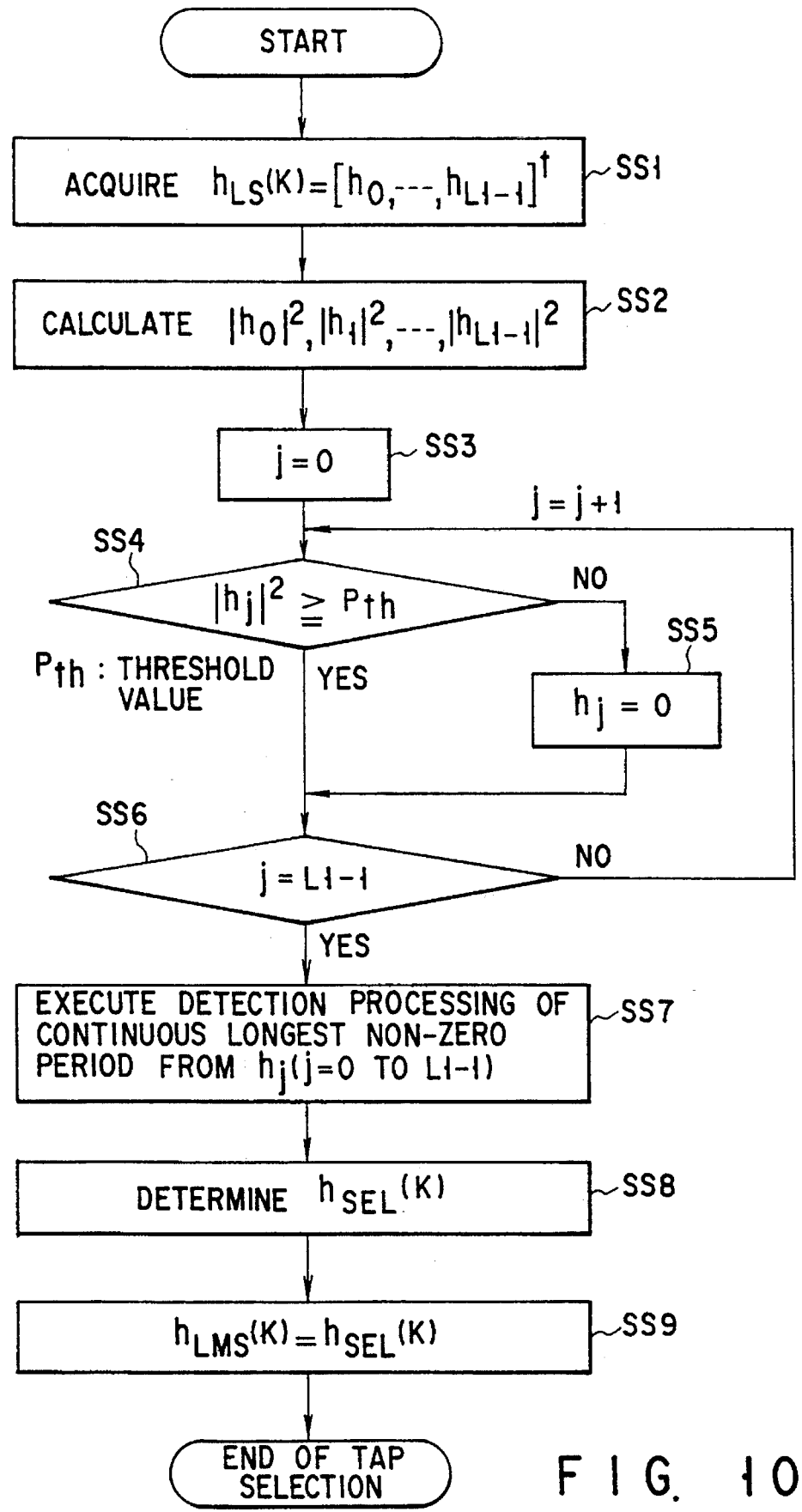
F I G. 10

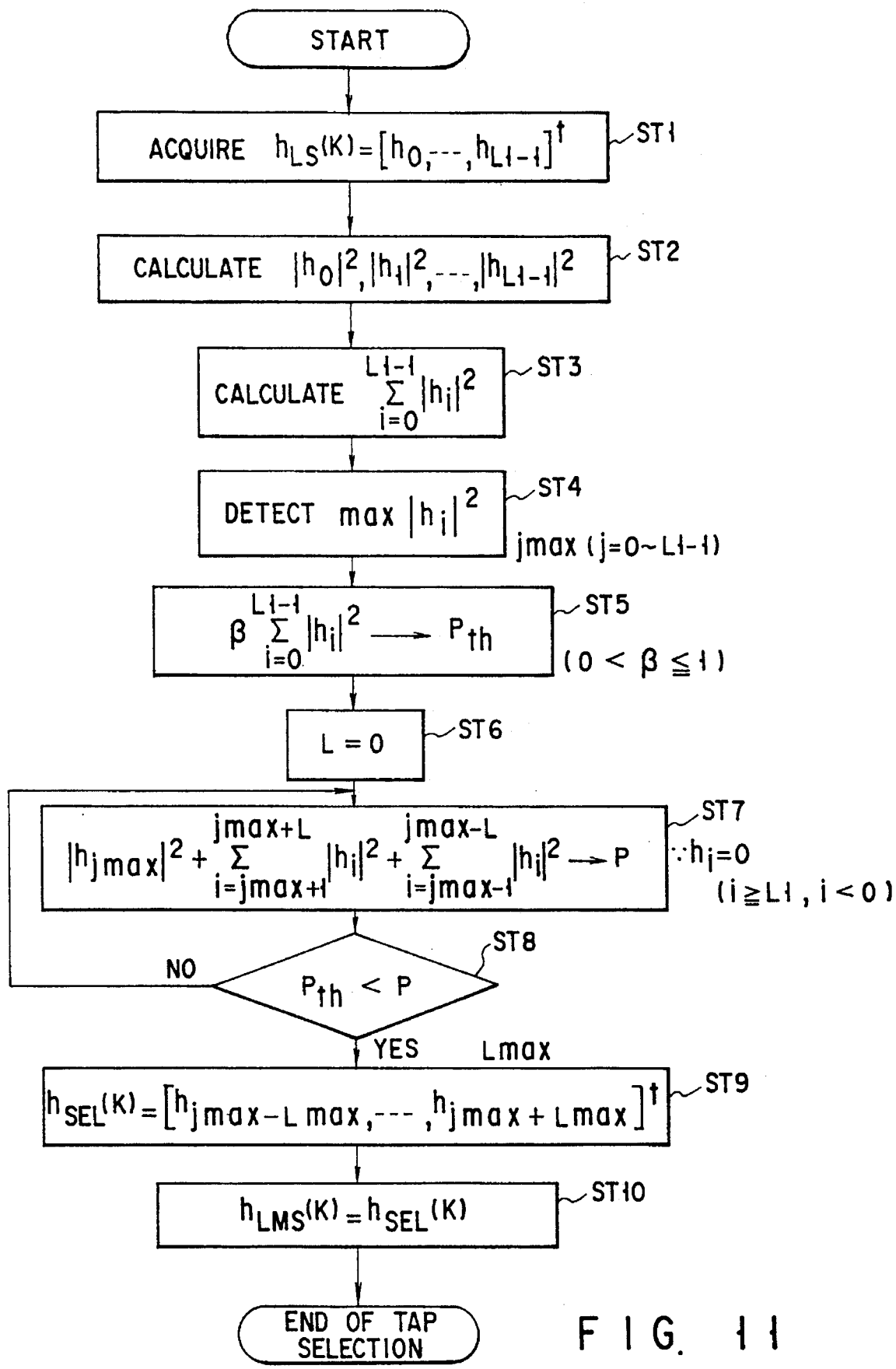
F I G. 11

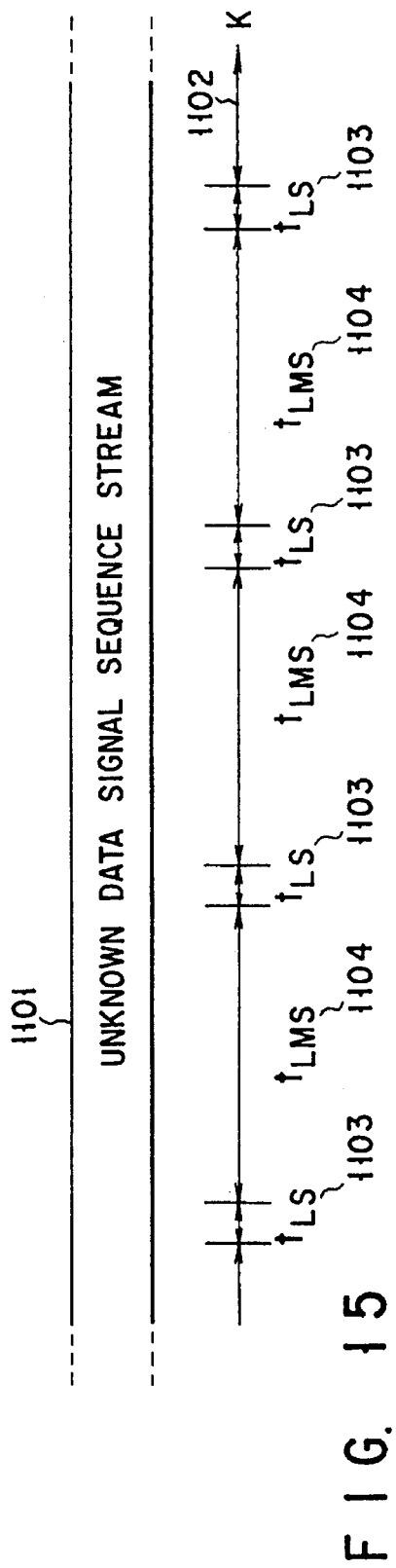
F I G. 15
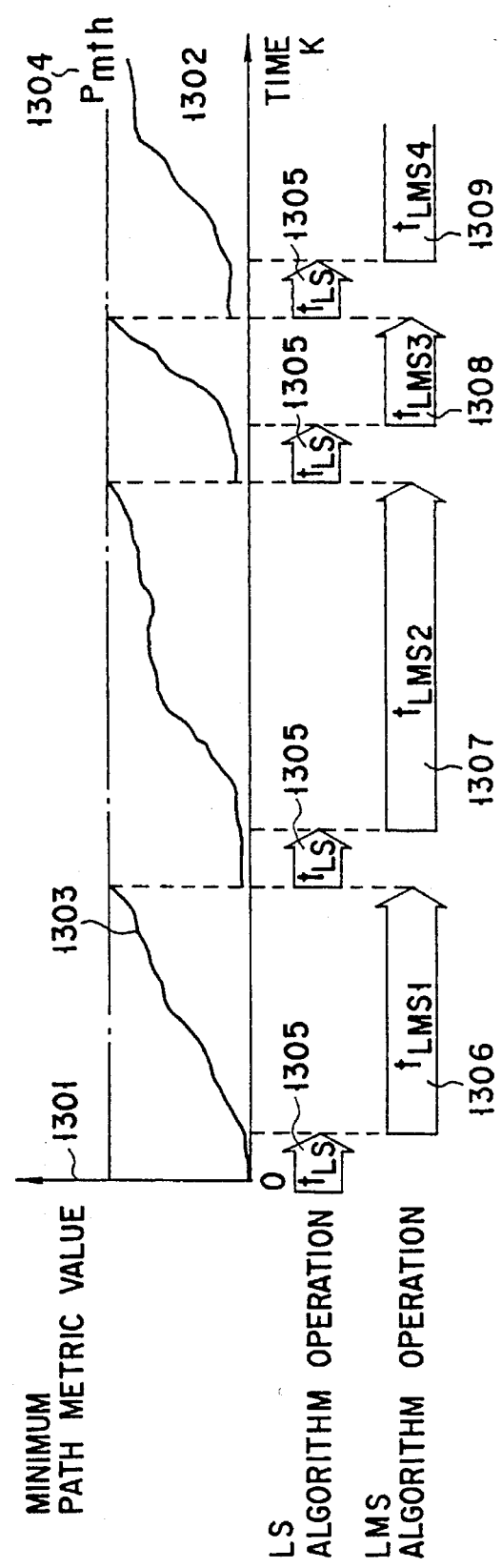
F I G. 16

ADAPTIVE MAXIMUM LIKELIHOOD SEQUENCE ESTIMATION APPARATUS AND ADAPTIVE MAXIMUM LIKELIHOOD SEQUENCE ESTIMATION METHOD

This application is a Continuation of application Ser. No. 08/308,423, filed on Sep. 19, 1994, now abandoned.

BACKGROUND OF THE INVENTION

1. Field of the Invention

The present invention relates to an adaptive maximum likelihood sequence estimation apparatus and an adaptive maximum likelihood sequence estimation method and, more particularly, to an adaptive maximum likelihood sequence estimation apparatus which is utilized as an equalizer for compensating for a distortion occurring in a received signal during passage on a transmission path in a receiver used in digital communication, and an adaptive maximum likelihood sequence estimation method therefor.

2. Description of the Related Art

In recent years, digital mobile communication devices have been rapidly developed. Upon execution of land mobile communications, a received signal suffers a complex, considerable distortion by a multi-frequency transmission interference accompanied by a transmission delay caused by a physical environment around a mobile station, and high-speed movement of the mobile station. A mobile terminal must compensate for distortion components including noise using some signal processing means for the received signal on which noise is further superposed. The waveform equalization technique in digital mobile communications is a technique for compensating for these distortions, and two major techniques are known. One technique is a DFE (Decision Feedback Equalizer), and the other technique is an MLSE (Maximum Likelihood Sequence Estimation). The feasibility of the former technique has been examined due to easy implementation expected in terms of the calculation amount, hardware scale, and the like. The latter technique is the best one of the waveform equalization techniques, and has become implementable by the remarkable development of the LSI micropatterning techniques and the advent of high-speed digital signal processing processors (DSPs) suited for digital signal processing.

The MLSE selects a transmission signal sequence, which best matches a received signal sequence, from all transmission signal sequences, which may be transmitted, using a Viterbi algorithm. The MLSE operates under the premise that a transmission path impulse response is known by some means. Therefore, in land mobile communications such as car telephone systems, since the transmission path characteristics vary every moment, the MLSE must also change the transmission path impulse response to follow the variation. For example, when a communication is made at a transmission rate of about 20 ksymbols/s, if the speed of a mobile station has reached about 100 km/h, fading having a cycle of about a 240-symbol time occurs.

Therefore, a deep fade occurs in the received signal at a 120-symbol cycle. In order to follow such a high-speed variation transmission path, various adaptive algorithms having high-speed convergence and high-speed followability are employed in a transmission path impulse response estimation unit of the MLSE. Most of these algorithms employ an LMS algorithm due to a small calculation amount. Also, in some cases, an RLS algorithm, which has a higher convergence speed but a larger calculation amount than those of the LMS algorithm, is employed while being designed to reduce the calculation amount.

In general, in digital land mobile communications, a TDMA system is employed as the communication system, and a channel of a single frequency is time-divided into units called slots, and a plurality of users are assigned to slots to increase the subscriber capacity. In order to discriminate time-divided slots from each other or to establish the synchronization of a receiver, a known signal sequence is assigned in each slot. For example, FIG. 12 shows a slot format 92 (down link) of North American Digital Cellular defined by IS-54 of the TIA, USA. Fourteen symbols located at the head of a slot are a known signal sequence 93 (SYNC). A transmission path impulse response must be sequentially updated while a transmission path impulse response estimation initial value is calculated from this known signal sequence and a received signal sequence corresponding to the known signal sequence so as to estimate an unknown data sequence following the known signal sequence. Therefore, whether or not an estimated value goes (converges) to a true transmission response as much as possible on the basis of the known signal sequence in the short cycle determines the performance of the receiver. For this reason, employment of the above-mentioned RLS algorithm or the like with high-speed convergence performance has been examined.

The operation of the MLSE will be briefly described in detail below. As described above, the MLSE operates under the premise that the transmission path impulse response is known, and obtains only one best matching transmission signal sequence from all possible transmission signal sequences (these sequences will be referred to as candidate sequences hereinafter). In order to determine this, a likelihood is known. The likelihood in the MLSE is efficiently calculated using the Viterbi algorithm.

FIG. 13 is a state transition diagram obtained when a QPSK modulation method is employed as a modulation method. In the case of QPSK modulation, there are four different symbols which can be transmitted at one time, and these symbols will be referred to as state 0, state 1, state 2, and state 3 (99, 910, 911, 912) hereinafter. A transition route from each state at a certain time to the state at the next time will be referred to as a path (917, 918, 919, 920) hereinafter. Paying attention to state 0 at time k, (1) there are four paths from the respective states at time k−1 to state 0 at time k.

(2) There are also four paths having a history of transiting to state 0 at time k:

time i k k−1 k−2 k−3 k−4
path 0→0-0-2-3-1 . . . →$x_0(k)$
path 1→0-1-3-3-1 . . . →$x_1(k)$
path 2→0-2-1-2-1 . . . →$x_2(k)$
path 3→0-3-0-2-1 . . . →$x_3(k)$ where $x_j(k)$ means the transmission signal vector constituted by signals subjected to mapping processing in accordance with a predetermined modulation method from transmission signal candidate sequences along paths to state j (j=0 . . . , 3) at time k.

(3) One and only path to each of the respective states at time k−1 is called a survivor path (913, 914, 915, 916), and transmission path impulse responses estimated by these survivor paths are respectively represented by $h_0(k-1)$, $h_1(k-1)$, $h_2(k-1)$, and $h_3(k-1)$.

(4) Estimated received signals $r_{k,0}$, $r_{k,1}$, $r_{k,2}$, and $r_{k,3}$ at time k of the respective paths are calculated using the transmission path impulse responses estimated along the paths of the four candidate sequences in item (2) above.

$\underline{r}_{k,j}=x_j{}^t(k)h_j(k-1)\rightarrow$estimated received signal of path j at time k where suffix t means the transposition of the matrix.

(5) A received signal at time k is represented by $r_k$, and a square of an error between the received signal and the estimated received signal will be referred to as a branch metric (bm) hereinafter.

$bm_{k,j}=|r_k-\underline{r}_{k,j}|^2\rightarrow$branch metric of path j at time k (6) The branch metric is calculated at respective times along the survivor paths, and accumulated values of four paths to state 0 at time k are calculated. This accumulated value will be referred to as a path metric (pm) hereinafter.

$pm_{k,0,j}=pm_{k-1,j}+bm_{k,j}$ where j=1, ..., 3, and when≧1, pm0,j=0.

(7) A path (one of paths 0 to 3) having the minimum one of the four path metrics of state 0 at time k calculated in item (6) is determined as a survivor path of state 0 at time k.

(8) An estimated transmission path impulse response $h_0(k)$ along the survivor path is calculated using an adaptive algorithm on the basis of the estimated transmission signal sequence of a finite length along the survivor path to state 0 at time k and the actual received signal sequence.

(9) This operation is similarly repeated from state 0 to state 3 at time k, and survivor paths to all the states at time k and estimated transmission path impulse responses are determined.

(10) When the last symbol of a sequence to be processed has been reached, a sequence with a minimum path metric calculated along a survivor path is determined as the final estimated transmission signal sequence.

The adaptive algorithm used in transmission path impulse response estimation of the MLSE will be briefly described below. Upon estimation of the transmission path impulse response along a survivor path in the above-mentioned item (8), the LMS algorithm or RLS algorithm to be described below is often used. A transmission signal vector constituted by a sequence which is mapped in accordance with a predetermined modulation method from a transmission signal candidate sequence along a survivor path in an arbitrary state at time k is represented by $x(k)=[x_{k-1}, \ldots, x_{k-L+1}]^t$. Suffix t means the transposition of the matrix. L is the tap length of a transversal filter which simulates the transmission path impulse response. At time k, an estimated received signal $\underline{r}_k$ is calculated based on a transmission path impulse response h(k−1) at time k−1. A difference, called an error signal $e_k$, between the estimated received signal and an actual received signal $r_k$ is given by:

$e_k=r_k-\underline{r}_k=r_k-x^t(k)h(k-1)$

In the LMS algorithm, the estimated transmission path impulse response h(k) at time k is calculated as follows:

$h(k)=h(k-1)+\mu e_k x^*(k)\rightarrow$LMS algorithm  (a)

where μ (0<μ<1) is the step size, and suffix * means the conjugate of the matrix.

In the RLS algorithm, h(k) is calculated as follows. The error signal $e_k$ is the same as that described above.

$K(k)=P(k-1)x^*(k)/\{\omega+x^t(k)P(k-1)x^*(k)\}$ $P(k)=\{P(k-1)-K(k)x^t(k)P(k-1)\}/\omega$ $h(k)=h(k-1)+K(k)e_k\rightarrow$RLS algorithm  (b)

where K(k) is the Kalman gain vector, P(k) is the covariance matrix of the error signal $e_k$ at time k, and ω is the forgetting coefficient.

As can be understood from the above description, since the RLS algorithm requires a larger amount of complicated matrix calculations than the LMS algorithm does, the total calculation amount becomes huge, and the RLS algorithm is rarely employed in the conventional system. Since K(k) is known during a known signal period, an MLSE, which comprises a transmission path impulse response estimation unit having the same high-speed convergence performance as the RLS algorithm while having the same calculation amount as the LMS algorithm by using K(k) in place of μx*(k) of the LMS algorithm, is also available.

However, the above-mentioned two adaptive algorithms, i.e., the LMS and RLS algorithms, require a certain known signal sequence length and repetitive calculations until they reach an optimal solution since they are recursive updating type algorithms, although they are adaptive algorithms having high-speed convergence performance. The known signal sequence length until convergence depends on the step size in the LMS algorithm, and depends on the forgetting coefficient in the RLS algorithm. However, the known signal sequence length of 14 symbols in the above-mentioned North American format slot shown in FIG. 12 is insufficient. In the MLSE, sequence estimation performance (code error rate) of an unknown signal sequence (information data) received after the known signal sequence largely depends on initial transmission path impulse response estimation including the influence of additional noise with high accuracy during the known signal sequence period when the viterbi algorithm is started before the influence of the additional noise is sufficiently suppressed and the estimated value converges to a true transmission path impulse response, a maximum likelihood estimation error may occur.

In either of the above-mentioned adaptive algorithms, i.e., the LMS and RLS algorithms, an operation for executing calculation processing using the above-mentioned equation (a) or (b) at each time to sequentially converge a solution to an optimal solution is required during the known signal sequence period.

Furthermore, in the conventional sequential updating MLSE, the tap length of a transversal filter which simulates the transmission path impulse response is fixed, and is normally determined based on the maximum value of the multi-path delay time of the transmission path. However, when the multi-path delay amount does not correspond to an integer multiple of an information transmission cycle, the intersymbol interference amount in a received signal increases, and the number of taps determined by the maximum value of the multi-path delay amount of the transmission path is normally short. An optimal number of taps changes in correspondence with the multi-path delay amount.

SUMMARY OF THE INVENTION

It is, therefore, an object of the present invention to provide an adaptive maximum likelihood sequence estimation apparatus and an adaptive maximum likelihood sequence estimation method, which can solve the problems associated with the convergence speed and the calculation amount of the conventional sequence updating type adaptive algorithms by assuring reliable estimation of a transmission path impulse response initial value during a known signal sequence period, which largely influences the operation performance of an MLSE, and by reducing the calculation amount.

In order to achieve the above object, an adaptive maximum likelihood sequence estimation apparatus according to the present invention comprises:

first estimation means for estimating a transmission signal sequence from received signals on the basis of an estimated transmission path impulse response;

second estimation means for estimating an estimated received signal at time k on the basis of one of a known signal sequence and the transmission signal sequence estimated by the first estimation means, and a transmission path impulse response estimated at time k−1;

error signal generation means for generating an error signal on the basis of a received signal at time k and the estimated received signal at time k from the second estimation means; and third estimation means for estimating a transmission path impulse response at time k using a predetermined adaptive algorithm on the basis of the error signal generated by the error signal generation means, wherein the third estimation means comprises means for estimating a transmission path impulse response by a non-recursive calculation during a reception period of a known signal sequence of the received signal, and for estimating a transmission path impulse response by a recursive calculation during a reception period of an unknown data signal sequence of the received signals following the known signal sequence period.

Also, an adaptive maximum likelihood sequence estimation method according to the present invention comprises:

the first estimation step of estimating a transmission signal sequence from a received signal on the basis of an estimated transmission path impulse response;

the second estimation step of estimating an estimated received signal at time k on the basis of one of a known signal sequence and the transmission signal sequence estimated in the first estimation step, and a transmission path impulse response estimated at time k−1;

the error signal generation step of generating an error signal on the basis of a received signal at time k and the estimated received signal at time k; and the third estimation step of estimating a transmission path impulse response at time k using a predetermined adaptive algorithm on the basis of the error signal generated in the error signal generation step, wherein the third estimation step comprises the step of estimating a transmission path impulse response by a non-recursive calculation during a reception period of a known signal sequence of the received signal, and of estimating a transmission path impulse response by a recursive calculation during a reception period of an unknown data signal sequence of the received signals following the known signal sequence period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a graph showing the code error rate characteristics of an independent two-wave Rayleigh fading transmission path according to a method of the first embodiment and a conventional independent two-wave Rayleigh fading transmission path;

FIGS. 7A to 7D are graphs for explaining the relationship between the multi-path delay amount g and intersymbol interference;

FIG. 10 is a flow chart showing an example of the transmission path impulse response initial estimation means in the transmission path impulse response estimation unit in the MLSE according to the first embodiment of the present invention;

FIG. 11 is a flow chart showing an example of the transmission path impulse response initial estimation means in the transmission path impulse response estimation unit in the MLSE according to the first embodiment of the present invention;

FIG. 15 is a timing chart showing the algorithm operation period when no known signal sequence is added in the second embodiment of the present invention;

FIG. 16 is an algorithm switching timing chart of an MLSE added with an automatic algorithm switching function of the present invention.

DETAILED DESCRIPTION OF THE PREFERRED EMBODIMENTS

Figure 1:
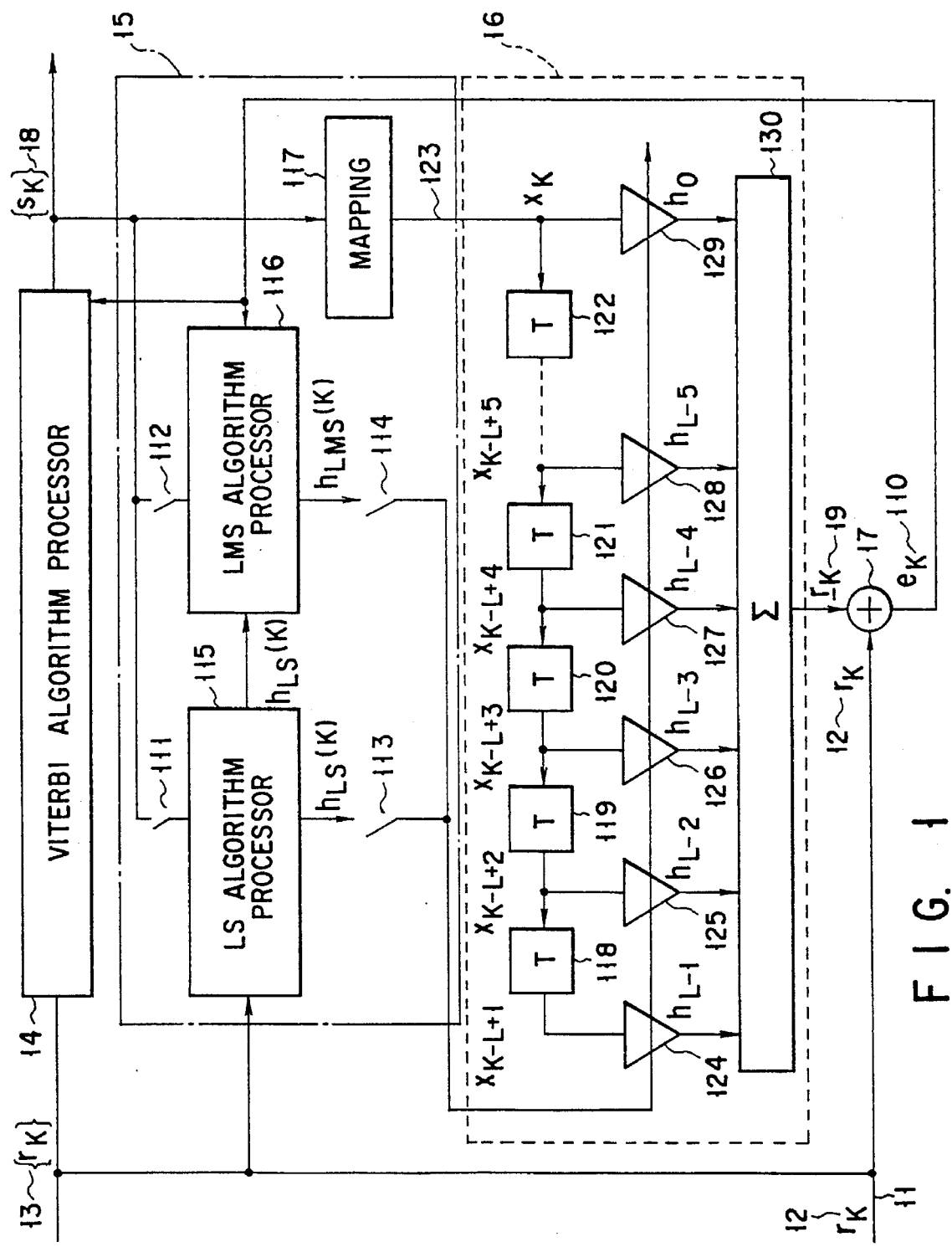
FIG. 1 is a functional block diagram of an MLSE according to the first embodiment of the present invention.

The first and second embodiments of the present invention will be described in detail below with reference to the accompanying drawings. First, the arrangement of the first embodiment will be briefly described below.

In the first arrangement of an adaptive maximum likelihood estimation apparatus (MLSE) according to this embodiment, which comprises: a viterbi algorithm processor for estimating a transmission signal sequence from a received signal on the basis of an estimated transmission path impulse response; estimated received signal calculation means for calculating an estimated received signal at time k on the basis of a known signal sequence or the transmission signal sequence estimated by the viterbi algorithm processor and the transmission path impulse response estimated at time k−1; error signal means for generating an error signal between the received signal at time k and the estimated received signal at time k; and a transmission path impulse response estimation unit for estimating a transmission path impulse response at time k using an adaptive algorithm on the basis of the error signal, the transmission path impulse response estimation unit estimates the transmission path impulse response by executing at least one LS (Least Squares) algorithm during a reception period of a known signal sequence in the received signal, without executing recursive repetitive calculations, and recursively estimates the transmission path impulse response using an LMS (Least Mean Squares) algorithm during a reception period of a data signal sequence.

In the second arrangement of this embodiment, the transmission path impulse response estimation unit comprises G matrix memory means for storing L×N matrix (to be referred to as G matrix hereinafter) data to be utilized in the matrix calculations, which data is calculated in advance from a known signal sequence to all or partial (continuous partial sequences) sequences of which a sequence length determined by a sum of a tap length L of a transmission path impulse response estimation transversal filter and a time window width N used in the matrix calculations (L+N−2 in practice) is assigned, and multiplication means for performing a matrix multiplication of the G matrix data read out from the G matrix storage means, and an N-element received signal vector (to be referred to as an r vector hereinafter) consisting of the received signal sequence corresponding to the known signal sequence used in the calculation of the G matrix data. In this arrangement, an L-element vector obtained as a result of a multiplication result becomes an estimated transmission path impulse response during the known signal period.

In the third arrangement, the number $L_1$ of taps of the estimated transmission path impulse response calculated using the LS algorithm during the known signal period is set to be larger than the number $L_2$ of taps of the estimated transmission path impulse response during a data sequence period which follows the known signal period in the first and second arrangements, thereby estimating a transmission path impulse response.

The fourth arrangement of this embodiment comprises, in the third arrangement, means for calculating an electric power value of each of $L_1$ taps of the transmission path impulse response estimated during the known signal sequence period, and means for selecting a combination which corresponds to a maximum sum total of electric power values of $L_2$ continuous taps of the $L_1$ taps. In this arrangement, a transmission path impulse response having the selected $L_2$ continuous taps is determined to be an estimated initial value.

The fifth arrangement of this embodiment comprises, in the third arrangement, means for calculating electric power of each of $L_1$ taps of the transmission path impulse response estimated during the known signal sequence period, and means for selecting continuous taps each having an electric power value larger than a predetermined threshold value from the $L_1$ taps. In this arrangement, the number of selected taps is set to be the number $L_2$ of taps of a transmission path impulse response estimation transversal filter during the data sequence period.

The sixth arrangement of this embodiment comprises, in the third arrangement, means for calculating electric power of each of $L_1$ taps of the transmission path impulse response estimated during the known signal sequence period, and means for selecting continuous taps having electric power values which become larger than a threshold value of an electric power value of a transmission path impulse response, which threshold value is determined in advance in correspondence with a sum total of electric power values of the $L_1$ taps. In this arrangement, the number of selected taps is set to be the number $L_2$ of taps of a transmission path impulse response estimation transversal filter during the data sequence period.

According to the first arrangement, since the LS algorithm is employed as the adaptive algorithm of the transmission path impulse response estimation processing unit in the MLSE, an optimal solution of the adaptive algorithm is calculated by a single matrix multiplication during the known signal sequence period of a finite length. For this reason, initial convergence performance need not be taken into consideration unlike a recursive updating type adaptive algorithm employed in a transmission path impulse response estimation processing unit in a conventional MLSE. In addition, a maximum likelihood sequence estimation error as a result of Viterbi algorithm processing which is started before the estimated value converges to an optimal solution can be prevented from occurring unlike in the recursive updating type algorithm, thus improving the performance of a receiver. The transmission path impulse response estimated value calculated during the known signal sequence period is very effectively utilized as an initial value of the LMS algorithm as an adaptive algorithm during the following data signal sequence period. The drawbacks of the LMS algorithm, which is normally employed as an adaptive algorithm of the MLSE due to its small calculation amount while overlooking at insufficient initial convergence performance, can be compensated for, and the calculation amount and the arrangement can be the same as those in the conventional MLSE.

According to the second arrangement, the LS algorithm is used in transmission path impulse response estimation during the known signal sequence period in the transmission path impulse response estimation processing unit in the above-mentioned MLSE. G matrix data which is independently calculated in accordance with the known signal sequence and stored in a memory area is read out using the known signal sequence as an address, and a multiplication of a received signal vector determined by a finite sequence period length as an object for which an optimal solution is calculated using the LS algorithm, and a matrix need only be performed, thereby obtaining an optimal solution in the finite sequence period length. Thus, since the LS algorithm need only be executed at least once during the known signal sequence period, i.e., since only a single matrix calculation need only be made, the calculation amount is very small as compared to the conventional recursive updating type algorithm, and can be effectively reduced.

A G matrix of the LS algorithm during the known signal sequence period as a means for reducing the calculation amount according to the second arrangement will be briefly described below.

Figure 14:
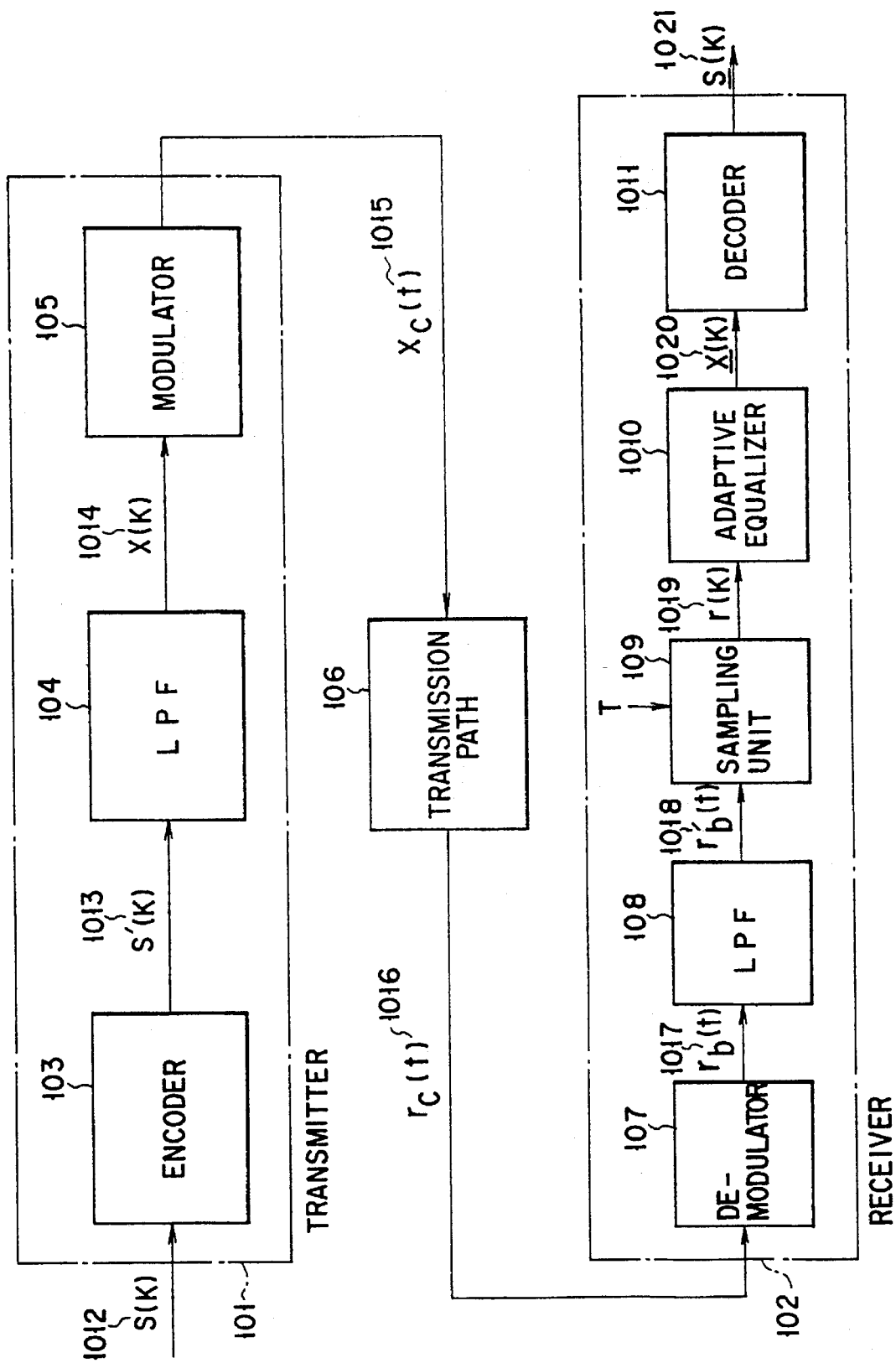
FIG. 14 is a block diagram showing a transmission/reception function for digital communications.

FIG. 14 is a block diagram showing the arrangement of a conventional transmitter/receiver for digital communications. Referring to FIG. 14, a digital information signal s(k) 1012 is input to an encoder 103 of a transmitter 101, and is encoded by a predetermined encoding method to obtain a code sequence s'(k) 1013. The code sequence s'(k) 1013 is band-limited by a LPF 104 to obtain a signal x(k) 1014. The signal x(k) is then modulated by a modulator 105. A modulated transmission signal $x_c(t)$ 1015 is input to a receiver 102 via a transmission path 106. A received signal $r_c(t)$ 1016 input to the receiver 102 is converted into a baseband signal $r_b(t)$ 1017 by a demodulator 107. The baseband signal $r_b(t)$ 1017 is band-limited by a LPF 108. A band-limited signal $r_b'(t)$ 1018 is sampled at a sampling cycle equal to an information symbol transmission cycle T by a sampling circuit 109, and the sampled signal is input as a signal sequence r(k) 1019 to an adaptive equalizer 1010. An output $\underline{x}$(k) 1020 from the adaptive equalizer 1010 is decoded by a decoder 1011 to obtain a reception digital information source $\underline{s}$(k) 1021. Time can be expressed like time kT using an ordinal number k. Note that a transmission path impulse response is simulated by a transversal filter having a tap interval T and L taps, and is expressed by the following L-element vector including tap gain sequences as elements:

$$h(k) = [h_0, h_1, h_2, \ldots, h_{L-2}, h_{L-1}]^t \quad (1)$$

(t means the transposition)

As a transmission signal vector, a vector consisting of L symbols is represented by s(k), and as a received signal vector corresponding to this vector, a vector consisting of N symbols is represented by r(k). The transmission signal vector s(k) is a transmission signal candidate sequence consisting of a known signal sequence or a signal sequence which is maximum-likelihood-estimated using the Viterbi algorithm. A transmission signal vector constituted by a sequence obtained by mapping s(k) according to a predetermined modulation method is represented by x(k), and these vectors are defined as follows:

$$s(k) = [s_k, s_{k-1}, s_{k-2}, \ldots, s_{k-L+2}, s_{k-L+1}]^t \quad (2)$$

$$x(k) = [x_k, x_{k-1}, x_{k-2}, \ldots, x_{k-L+2}, x_{k-L+1}]^t \quad (3)$$

$$r(k) = [r_k, r_{k-1}, r_{k-2}, \ldots, r_{k-N+2}, r_{k-N+1}]^t \quad (4)$$

Furthermore, an N×L matrix defined by N transmission signal vectors, i.e., vectors x(k) to x(k−N+1) is represented by X(k).

$$X(k) = [x(k), x(k-1), \ldots, x(k-N+1)]^t \quad (5)$$

Converging X(k)h(k)=$\underline{r}$(k) to r(k) when a transmission path impulse response h(k) is unknown is considered below. $\underline{r}$(k) is the estimated received signal vector at time k. In order to solve this optimization problem, the following evaluation function E(k) need only be minimized:

$$E(k) = \sum_{i=-N+1}^{0} |e_{k+i}|^2 + \delta h^{*t}(k)h(k) \quad (6)$$

($\delta$ is a small integer)

$$= \sum_{i=-N+1}^{0} e_{k+i}^* e_{k+i} + \delta h^{*t}(k)h(k)$$

(* is the complex conjugate and t is the transposition)

$$= [X(k)h(k) - \underline{r}(k)]^{*t}[X(k)h(k) - \underline{r}(k)] + \delta h^{*t}(k)h(k)$$

where $$e_{k+i} = x^t(k+i)h(k) - R_{k+i}.$$

An optimal solution $h_{opt}$ for minimizing the evaluation function E(k) is expressed by:

$$h_{opt}(k) = [X^{*t}(k)X(k) + \delta I]^{-1} X^{*t}(k)r(k) \quad (7)$$

where I is the L-th order unit matrix. $[X^{*t}(k)X(k)+\delta I]$ in the right side of equation (6) has an inverse matrix since it always becomes a regular matrix. In the MLSE, the matrix X(k) is determined by only a known signal sequence of a finite length (N+L−2) up to time k or a survivor path of a given state at time k−1, and a path from the given state to an arbitrary state at time k. For this reason, in the optimal transmission path impulse response given by equation (7), $[X^{*t}(k)X(k)+\delta I]^{-1}X^{*t}(k)$ can be calculated in advance if a transmission signal sequence up to time k is known. Note that a G(k) matrix as the L×N matrix is defined again:

$$G(k) = [X^{*t}(k)X(k) + \delta I]^{-1} X^{*t}(k) \quad (8)$$

The optimal transmission path impulse response estimated value $h_{opt}$ is expressed, using G(k) given by equation (8), as:

$$h_{opt}(k) = G(k)r(k) \quad (9)$$

Therefore, the second arrangement of this embodiment is obtained. Since the MLSE which adopts this arrangement can be established by either a known signal sequence or a sequence maximum-likelihood estimated using the Viterbi algorithm upon estimation of the transmission path impulse response, maximum likelihood estimation can be performed without requiring a known signal sequence in the extreme case.

According to the third arrangement, at least one transmission path impulse response estimation can be performed in a small calculation amount during the known signal sequence period upon application of the first and second arrangements. Therefore, even when the tap length of a transmission impulse response estimation transversal filter during the known signal sequence period is set to be larger than that of the transmission impulse response estimation transversal filter during the data signal sequence period, the calculation amount is not largely increased. Therefore, the transmission path impulse response in a received signal with a large intersymbol interference amount can be accurately recognized, and an optimal number of taps during the data signal sequence period can be determined. Since the intersymbol interference amount is proportional to the electric power value of each tap gain if the tap interval of the transversal filter is set to be equal to the information symbol transmission cycle interval, it can be an index for a large intersymbol interference amount when electric power values are calculated at many taps.

According to the fourth arrangement, upon application of the third arrangement, since a combination corresponding to a maximum sum of electric power values of a plurality of continuous taps of a plurality of tap gains of the transmission path impulse response estimated during the known signal sequence period maximizes the S/N ratio of the estimated received signal, and allows optimal maximum likelihood estimation. For this reason, when a transmission path impulse response estimated value during the known signal sequence period is calculated using the number of taps larger than that during the data signal sequence period, and a combination of taps corresponding to a total electric power value of taps is selected from these taps in correspondence with the number of taps during the data signal sequence period, the number of taps required for optimal transmission path impulse response estimation can be determined, thus improving maximum likelihood sequence estimation performance.

According to the fifth arrangement, upon application of the third arrangement, the number of continuous taps each of which has an electric power value larger than a predetermined threshold value in the electric power values of taps of the transmission path impulse response calculated during the known signal sequence period is obtained, and is set to be the number of taps of a transmission path impulse response transversal filter during the following data signal sequence period. In this manner, the number of taps required for optimal transmission path impulse response estimation corresponding to the intersymbol interference amount included in a received signal can be determined, thus improving maximum likelihood sequence estimation performance.

According to the sixth arrangement, upon application of the third arrangement, the number of continuous taps which have a total electric power value larger than a predetermined threshold value of that of a transmission path impulse response with respect to the sum total of the electric power values of the transmission path impulse response calculated during the known signal sequence period is set to be the number of taps of a transmission path impulse response transversal filter during the following data signal sequence period. In this manner, the number of taps required for optimal transmission path impulse response estimation corresponding to the intersymbol interference amount included in a received signal can be determined, thus improving maximum likelihood sequence estimation performance.

The first embodiment will be described in more detail below with reference to the accompanying drawings.

FIG. 1 is a functional block diagram of the MLSE according to the first embodiment of the present invention. A Viterbi algorithm processor 14, a transmission path impulse response estimation unit 15, an estimated received signal calculator 16, and an error signal generator 17 are constituted by VLSIs such as gate arrays and digital signal processing devices (DSPs). An input terminal 11 of the MLSE receives a received signal $r_k$ 12 (FIG. 14) which is sampled at an information transmission cycle interval. The viterbi algorithm processor 14 has a series of processing functions of fetching the received signal $r_k$ 12 as a received signal sequence $\{r_k\}$ 13, causing the error signal generator 17 to generate an error between the received signal $r_k$ 12 and an estimated received signal 19 calculated by the estimated received signal calculator 16 using a transmission path impulse response estimated by the transmission path impulse response estimation unit 15, and executing branch metric calculations and path metric calculations by utilizing an error signal $e_k$ 110.

The transmission path impulse response estimation unit 15 has a function of estimating a transmission path impulse response from a transmission signal candidate sequence $\{s_k\}$ 18 and the received signal $r_k$ 12 using an adaptive algorithm, and supplying the estimated transmission path impulse response to the estimated received signal calculator 16. The transmission path impulse response estimation unit 15 can perform transmission path impulse response estimation using two different adaptive algorithms. In this unit, one algorithm is an LS algorithm processor 115, and the other algorithm is an LMS algorithm processor 116. The LS algorithm processor 115 receives a known signal sequence or a maximum likelihood estimated sequence from the Viterbi algorithm processor 14 as the transmission signal candidate sequence $\{s_k\}$ 18 via a switch 111, and calculates a transmission path impulse response estimated value $h_{LS}(k)$ using the received signal $r_k$ 12 input from the input terminal 11 of the MLSE in addition to the above-mentioned sequence 18. The LMS algorithm processor 116 receives the transmission signal candidate sequence $\{s_k\}$ 18 from the Viterbi algorithm processor 14 via a switch 112, and also receives the error signal $e_k$ 110 from the error signal generator 17. The unit 116 then calculates a transmission path impulse response estimated value $h_{LMS}(k)$. The LS algorithm processor 115 supplies the transmission path impulse response estimated value to tap gains 124, 125, 126, 127, 128, and 129 of a transversal filter of the estimated received signal calculator 16 via a switch 113, and also supplies it to the LMS algorithm processor 116 as an adaptive algorithm initial value in the LMS algorithm processor 116. The LS algorithm processor 115 supplies the transmission path impulse response estimated value to the estimated received signal calculator 16 via the switch 113 only during a time interval 24 in which the algorithm is activated by a training signal 22 in a slot format 21 shown in FIG. 2. Therefore, the switch 113 is set in an ON state during only this time interval 24, and is set in an OFF state during the following time interval 25. The switch 111 also operates in synchronism with the switch 113. On the other hand, the LMS algorithm processor 116 supplies the transmission path impulse response estimated value to the estimated received signal calculator 16 via a switch 114 during only the time interval 25 in which the algorithm is activated by a data field signal sequence 23 in the slot format 21 shown in FIG. 2. Therefore, the switch 114 is set in an ON state during only this time interval 25, and is set in an OFF state during the previous time interval 24. The switch 112 also operates in synchronism with the switch 114.

The estimated received signal calculator 16 sets the estimated transmission path impulse response supplied from the transmission path impulse response estimation unit 15 in the taps 124, 125, 126, 127, 128, and 129 of the transversal filter. The transmission signal candidate sequence $\{s_k\}$ supplied from the viterbi algorithm processor 14 is subjected to mapping processing according to a predetermined modulation method by a mapping processor 117, and thereafter, is supplied to the transversal filter of the estimated received signal calculator. A mapping signal 123 input to the transversal filter is shifted via delay elements 118, 119, 120, 121, and 122, and the shifted signals are respectively subjected to weighting calculations with the transmission path impulse response estimated values set in the taps 124, 125, 126, 127, 128, and 129. The calculation results are added to each other by an adder 130 to obtain an estimated received signal $\underline{r}_k$ 19, and the estimated received signal $\underline{r}_k$ 19 serves as an input signal to the error signal generator 17.

The error signal generator 17 receives the estimated received signal $\underline{r}_k$ 19 from the estimated received signal calculator 16 and the received signal $r_k$ 12 from the input terminal 11 of the MLSE, and generates the error signal $e_k$ 110. The error signal $e_k$ 110 generated by the error signal generator 17 is input to the viterbi algorithm processor 14, and is used in the branch metric calculations and the path metric calculations in the processor 14. The error signal $e_k$ 110 is also supplied to the LMS algorithm processor 116 in the transmission path impulse response estimation unit 15, and is used in updating calculations of the transmission path impulse response estimated values using the LMS algorithm.

As described above, in the transmission path impulse response estimation unit 15, two different algorithms, i.e., the LS and LMS algorithms, are executed. In this case, as is known, an estimation delay of (N−1)/2 (N: the time window width) is generated in the transmission path impulse response estimated value $h_{LS}(k)$ estimated using the LS algorithm, and an estimation delay of $(1-\mu)/\mu$ ($\mu$: the step size) is generated in the transmission path impulse response estimated value $h_{LMS}(k)$ estimated using the LMS algorithm. If the estimation delays of these two algorithms are different from each other, an error is generated. For this reason, in this embodiment, in order to cause the two estimation delays to coincide with each other, the time window width N assuming an integral value is determined first, and the value f is calculated based on an equation $(N-1)/2=(1-\mu)/\mu$.

Figure 3:
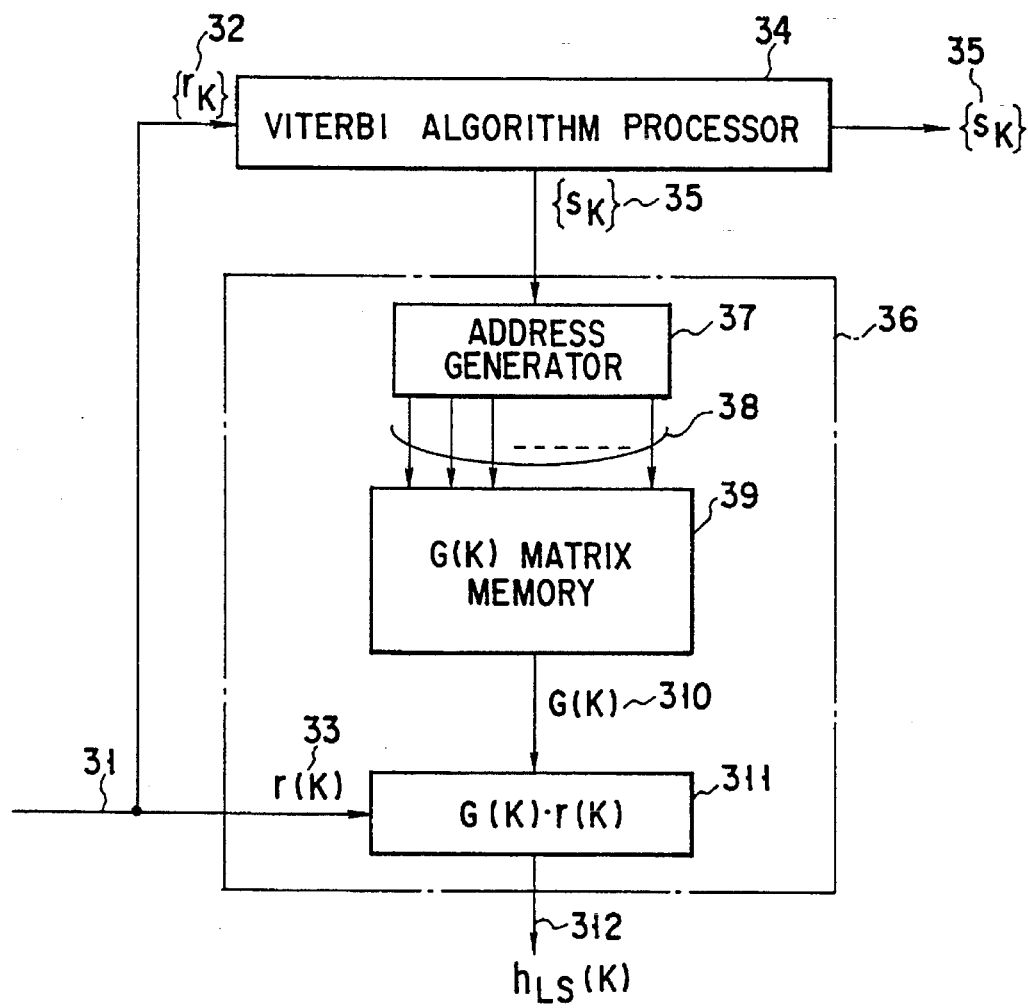
FIG. 3 is a functional block diagram of an LS algorithm processor unit in a transmission path impulse response estimation unit.

FIG. 3 is a functional block diagram in the LS algorithm processor in the transmission path impulse response estimation unit as one of functions in the MLSE according to the embodiment of the present invention. A Viterbi algorithm processor 34 shown in FIG. 3 is the same as the viterbi algorithm processor 14 shown in FIG. 1, and supplies a known signal sequence or a maximum-likelihood-estimated sequence $\{s_k\}$ 35 to an LS algorithm processor 36. The LS algorithm processor 36 also receives a received signal vector r(k) 33 input from an input terminal 31 of the MLSE in addition to the input from the viterbi algorithm processor 34. In the LS algorithm processor 36, the sequence $\{s_k\}$ from the Viterbi algorithm processor 34 is connected and input to an address generator 37. The address generator 37 generates an address signal 38 for a memory area in which a G(k) matrix utilized in the LS algorithm processing is stored.

Since a one-to-one correspondence is established between the G(k) matrix and the sequence $\{s_k\}$ supplied from the Viterbi algorithm processor 34, a unique address signal 38 can be generated based on the sequence $\{s_k\}$. The signal line of the address generator 37 is connected to a memory area 39 in which the G(k) matrix is stored, and a desired G(k) matrix is read out in correspondence with the address signal 38. The memory area 39 for the G(k) matrix comprises, e.g., a ROM (Read Only Memory), a RAM (Random Access Memory), or the like. A G(k) matrix 310 unique to the sequence $\{s_k\}$, which matrix is output from the G(k) matrix memory area 39, is input to a matrix multiplication processor 311 to which the output of the G(k) matrix memory area 39 is connected. The matrix multiplication processor 311 performs a matrix multiplication (G(k)r(k)) of the G(k) matrix 310 read out from the G(k) matrix memory area 39 and the received signal vector 33 input to the LS algorithm processor 36. The matrix multiplication processor 311 outputs the multiplication result as an estimated transmission path impulse response $h_{LS}(k)$ 312.

Figure 4:
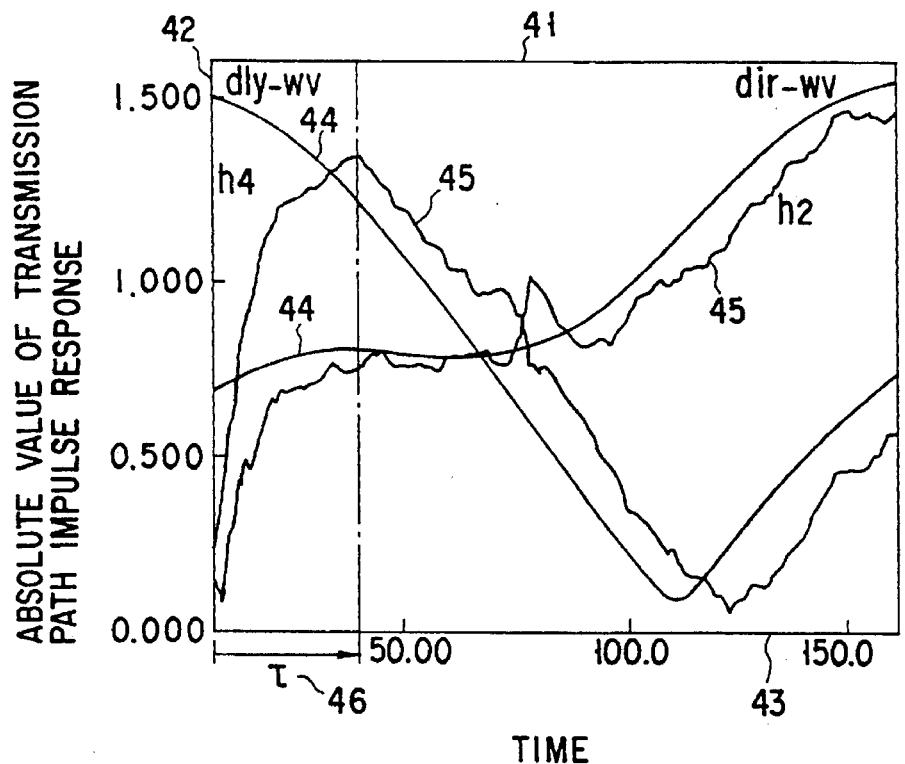
FIG. 4 is a graph showing the transmission path impulse response estimation result using an LMS algorithm.
Figure 5:
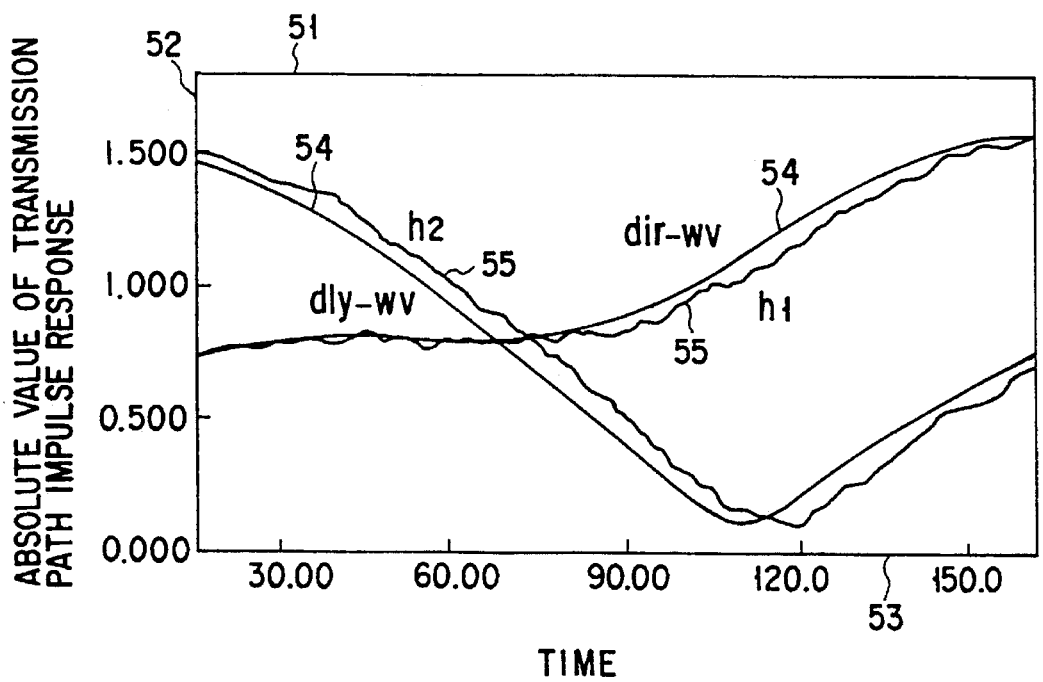
FIG. 5 is a graph showing the transmission path impulse response estimation result using an LS algorithm.

FIGS. 4 and 5 are views showing the actual performance as the effects of the MLSE of this embodiment in comparison with the conventional system. The conventional system almost coincides with a case wherein the switches 111 and 113 are kept in an OFF state, and the switches 112 and 114 are kept in an ON state in FIG. 1 showing the arrangement of this embodiment. In FIG. 4, recursive updating processing based on the LMS algorithm is always executed, and the convergence state, of a true value described in FIG. 4 for the purpose of comparison, to a transmission path impulse response 44 can be well understood from FIG. 4. In the case of the recursive updating type algorithm, the initial value is normally set to be 0. Then, a transmission path impulse response 45 is sequentially estimated. In this case, a delay of $\tau$ 46 is required until convergence.

Figure 2:
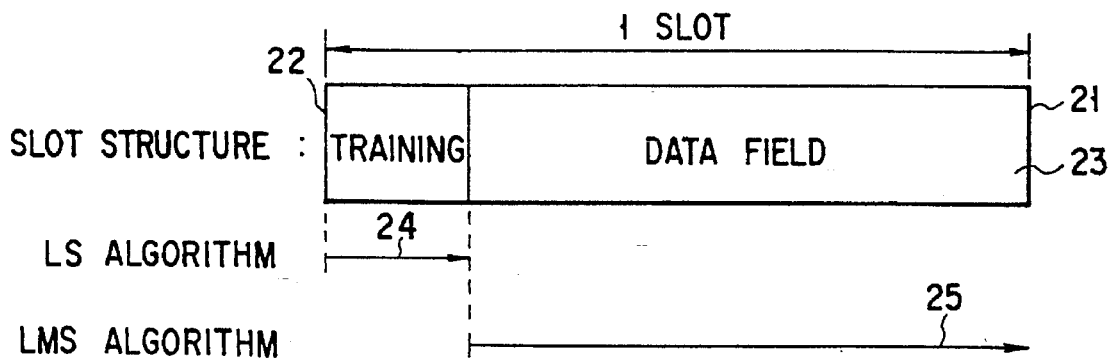
FIG. 2 is a view showing the TDMA slot format and the operation period of a transmission path impulse response estimation algorithm.

As can be understood from FIG. 4, a delay of about a 40-symbol time is generated. Since the length of the known signal sequence (training signal sequence) 22 added to the TDMA slot 21 shown in FIG. 2 is normally 20 symbols or less, an error tends to occur in the maximum likelihood sequence estimation due to the delay of the initial convergence time. FIG. 5 shows a case wherein the transmission path impulse response estimation unit of this embodiment is adopted in the transmission path impulse response initial estimation. In FIG. 5, an estimated transmission path impulse response 55 always follows a true value transmission path impulse response 54. Thus, a maximum likelihood sequence estimation error caused by the transmission path impulse response initial convergence delay can be suppressed.

FIG. 6 is a graph showing the code error rate characteristics of the MLSE according to the embodiment of the present invention. Referring to FIG. 6, an independent two-wave Rayleigh fading transmission path has $\tau/T=1.0$, D/U=0.0 (dB), and $f_d=82$ (Hz). FIG. 6 shows a maximum likelihood sequence estimation performance curve 64 obtained upon employment of conventional transmission path impulse response estimation based on only the LMS algorithm, and a maximum likelihood sequence estimation performance curve 65 according to the method of this embodiment. The effectiveness of the transmission path impulse response initial estimation method of this embodiment can be understood from FIG. 6.

FIGS. 7A to 7D are graphs showing the relationship between the multi-path delay amount and the intersymbol interference amount included in a received signal. FIGS. 7A and 7B show intersymbol interference amounts in the case of $\tau=T$, and FIGS. 7C and 7D show intersymbol interference amounts in the case of $\tau=0.5$ T. When a two-wave multi-path delay amount generated in the transmission path 106 in the transmitter/receiver for digital communications shown in FIG. 14 corresponds to one information transmission cycle, if the received signal is sampled at the information transmission cycle interval, a transmission path impulse response 75 corresponding to two waves need only be estimated. However, when the two-wave multi-path delay amount generated in the transmission path 106 does not correspond to one information transmission cycle, if the received signal is sampled at the information transmission cycle interval, maximum likelihood sequence estimation performance deteriorates unless a transmission path impulse response 717 is estimated. Therefore, even in the two-wave multi-path mode, the transmission path impulse response 717 having a larger number of taps must be estimated. In consideration of this, FIG. 8 shows an embodiment of the present invention.

Figure 8:
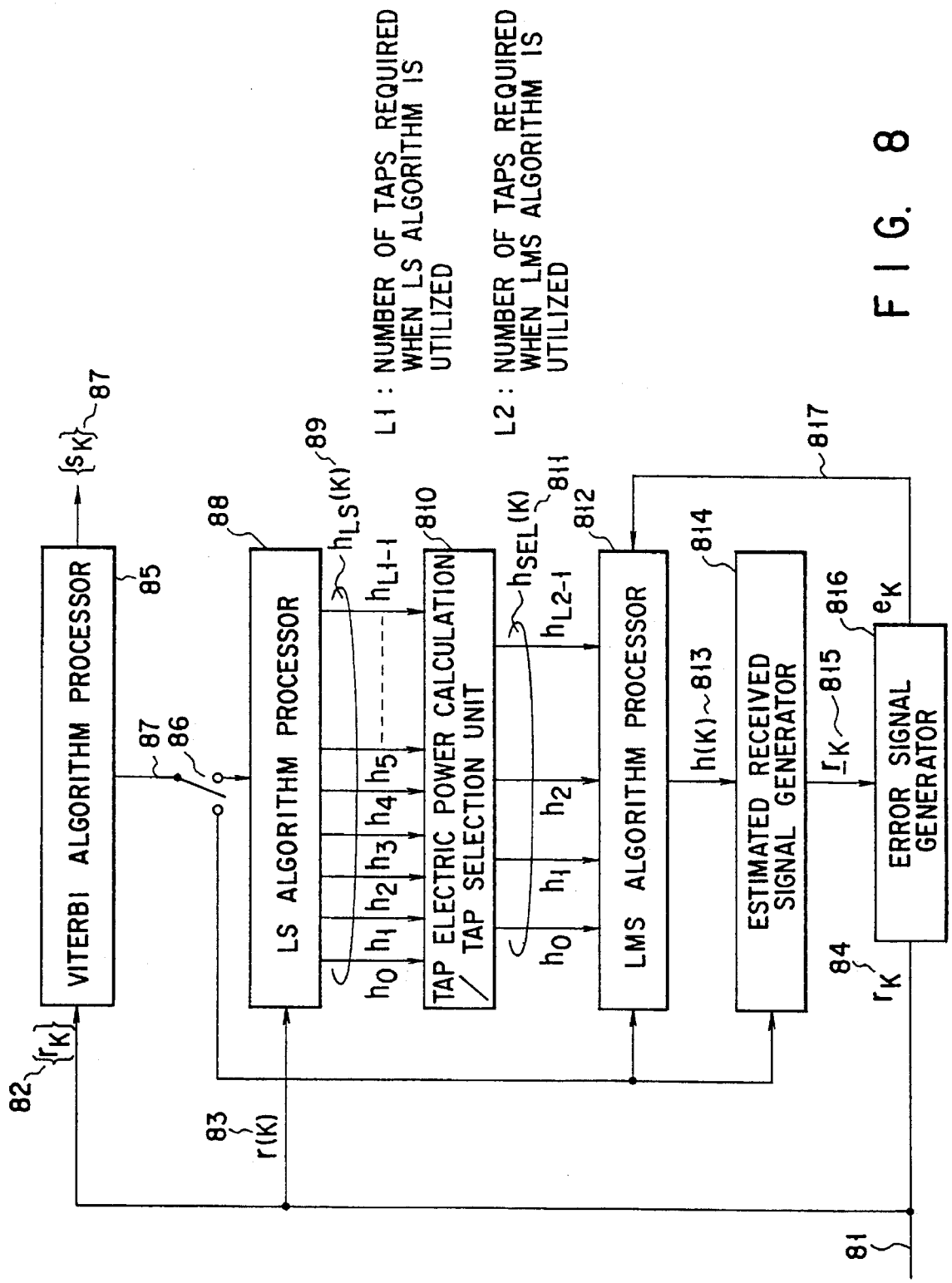
FIG. 8 is a block diagram showing a transmission path impulse response initial estimation function in a transmission path impulse response estimation unit in the MLSE according to the first embodiment of the present invention.

FIG. 8 is a block diagram of the MLSE including a transmission path impulse response tap gain initial setting function and a tap selection function of a transversal filter for simulating a transmission path impulse response. A Viterbi algorithm processor 85 shown in FIG. 8 has the same function as the Viterbi algorithm processor 14 shown in FIG. 1, and executes a series of operations for receiving a received signal sequence $\{r_k\}$ 82 from an input terminal 81 of the MLSE and outputting a sequence $\{s_k\}$ maximum-likelihood-estimated by Viterbi algorithm processing. An output terminal 87 of the viterbi algorithm processor 85 is connected to an LS algorithm processor 88 via a switch 86. The output terminal 87 is also connected to an LMS algorithm processor 812 and an estimated received signal generation unit 814 via the switch 86. The switch 86 is connected to the LS algorithm processor 88 during only the LS algorithm operation time interval 24 in the TDMA slot 21 shown in FIG. 2, and receives the known signal sequence or the maximum-likelihood-estimated sequence $\{s_k\}$ 87 from the viterbi algorithm processor 85.

Also, the switch 86 is connected to the LMS algorithm processor 812 and the estimated signal generation unit 814 during only the LMS algorithm operation time interval 25 in FIG. 2, and similarly receives the sequence $\{s_k\}$ 87. The LS algorithm processor 88 generates a transmission path impulse response estimated value $h_{LS}(k)$ 89 on the basis of the sequence $\{s_k\}$ 87 input via the switch 86 and a received signal vector r(k) 83 input from the input terminal 81 of the MLSE. The transmission path impulse response estimated value $h_{LS}(k)$ 89 consisting of a total of $L_1$ taps is supplied to a tap gain electric power calculation/tap selection unit 810. The tap gain electric power calculation/tap selection unit 810 calculates the electric power values of the $L_1$ tap gains, selects $L_2$ taps, and supplies a transmission path impulse response $h_{SEL}(k)$ 811 consisting of the selected $L_2$ taps to the LMS algorithm processor 812. The LMS algorithm processor 812 determines the selected transmission path impulse response $h_{SEL}(k)$ 811 supplied from the tap gain electric power calculation/tap selection unit 810 as a transmission path impulse response estimation initial value. During the LMS algorithm operation time interval 25 shown in FIG. 2, the LMS algorithm processor 812 performs LMS algorithm calculations using the maximum-likelihood-estimated sequence $\{s_k\}$ 87 received from the viterbi algorithm processor 85 via the switch 86, and an error signal $e_k$ 817 received from an error signal generation unit 816, and supplies an estimated transmission path impulse response h(k) 813 to the estimated received signal generation unit 814. The estimated received signal generation unit which receives the estimated transmission path impulse response h(k) 813 is also connected to the viterbi algorithm processor 81 via the switch 86, and receives the maximum-likelihood-estimated sequence $\{s_k\}$ 87 to generate an estimated received signal $r_k$ 815. The error signal generation unit 816 receives the estimated received signal $r_k$ 815 from the estimated received signal generation unit 814 and a received signal $r_k$ 84 from the input terminal 81 of the MLSE, and generates the error signal $e_k$ 187.

Figure 9:
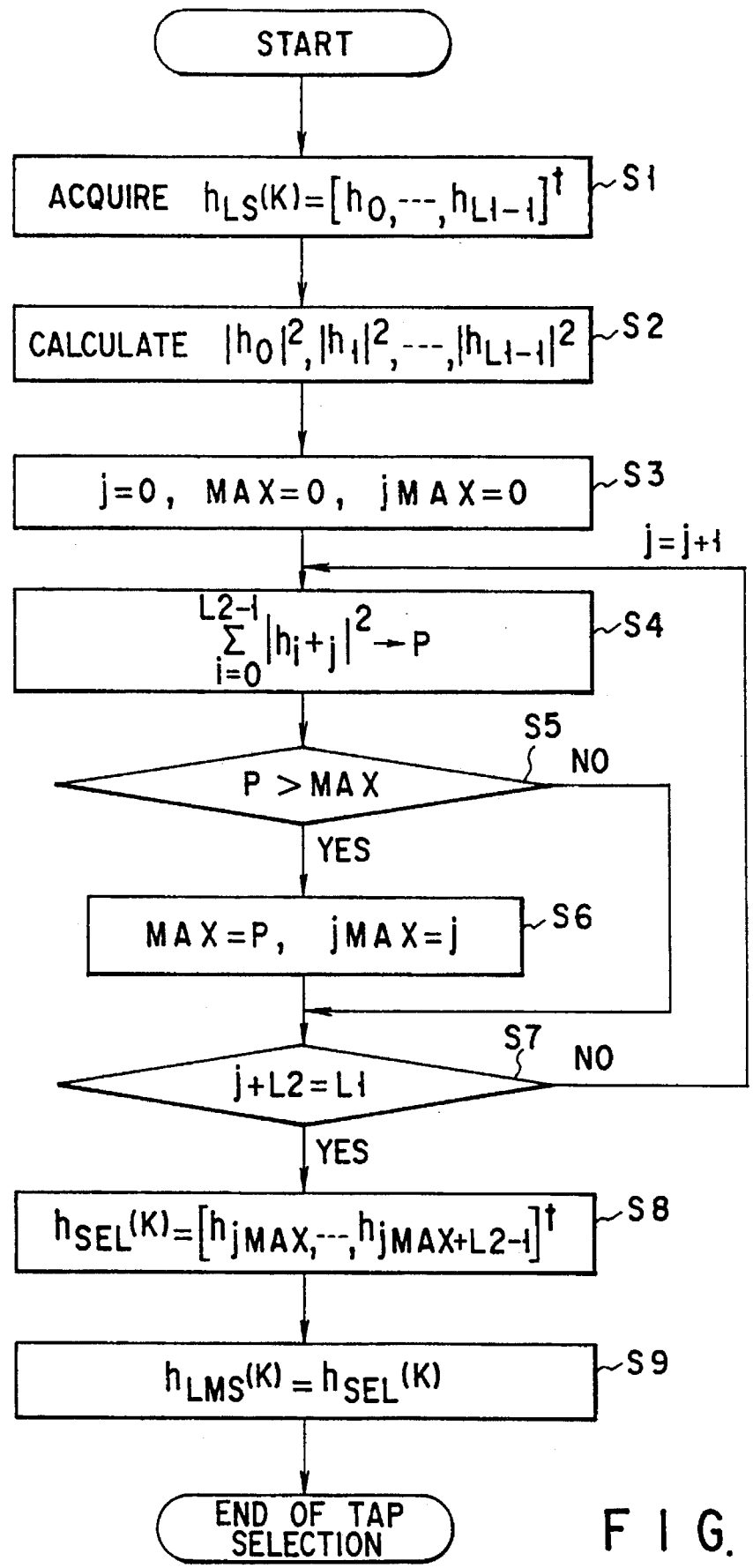
FIG. 9 is a flow chart showing an example of transmission path impulse response initial estimation means in the transmission path impulse response estimation unit in the MLSE according to the first embodiment of the present invention.
Figure 12:
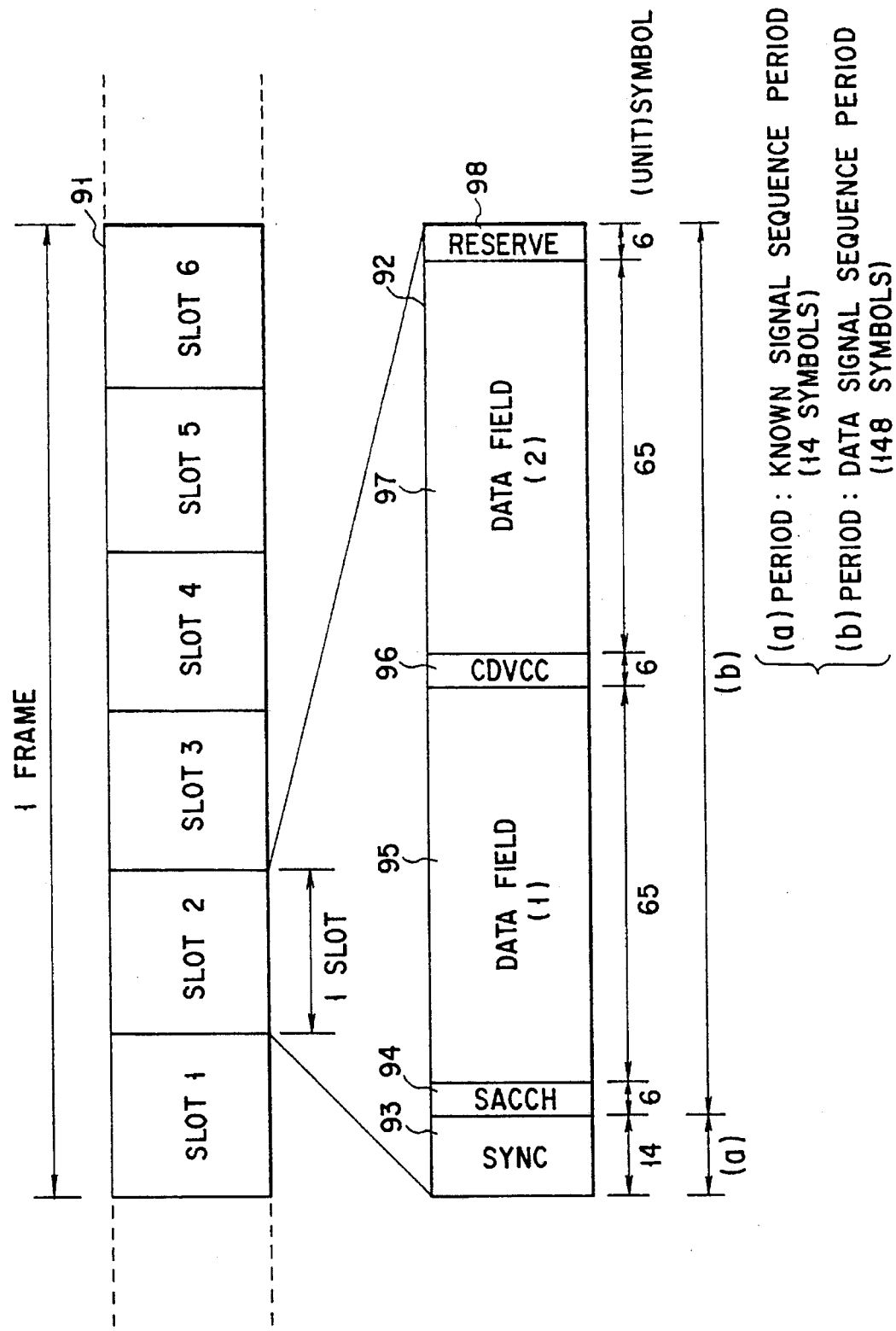
FIG. 12 is a view showing an example of a TDMA frame format (North American format)
Figure 13:
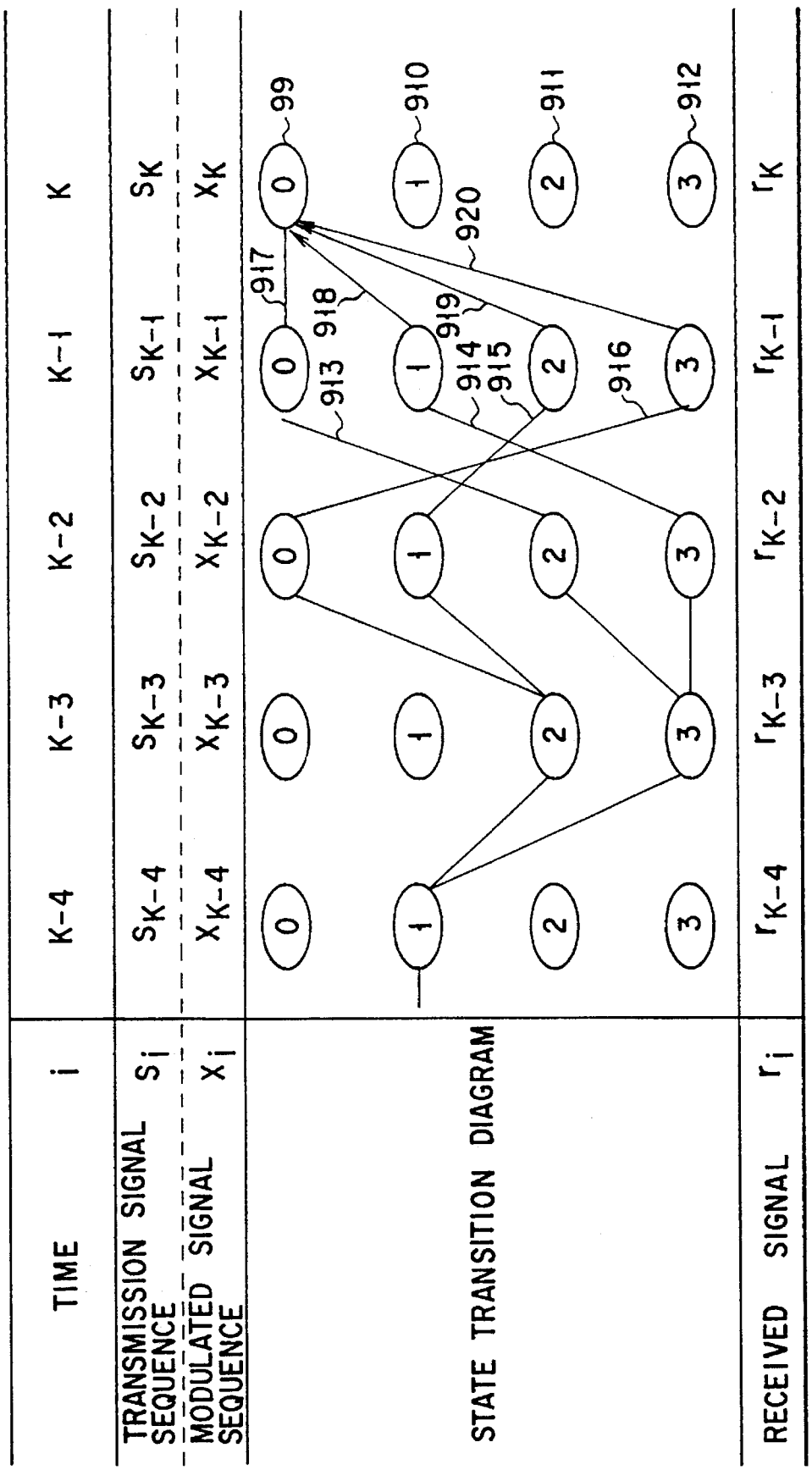
FIG. 13 is a state transition diagram of an MLSE upon employment of QPSL modulation.

FIG. 9 is a flow chart showing a tap gain selection algorithm. The operation will be described below with reference to FIG. 9. Note that S, SS, and ST in the following description indicate steps.

(1) A transmission path impulse response $h_{LS}(k)$ estimated by the LS algorithm processor is acquired (S1).

(2) The electric power values of $L_1$ tap gains of the transmission path impulse response $h_{LS}(k)$ are calculated (S2).

(3) Sum totals of the electric power values of $L_2(L_1 > L_2)$ continuous tap gains are calculated from the $L_1$ tap gains of the transmission path impulse response $h_{LS}(k)$ for which the electric power values were calculated (S3, S4).

(4) A maximum combination is selected from all combinations each consisting of $L_2$ tap gains (S5, S6, S7).

(5) A transmission path impulse response having the selected $L_2$ tap gains is determined to be $h_{SEL}(k)$ (S8).

(6) The transmission path impulse response $h_{SEL}(k)$ is set to be an estimation initial value of the transmission path impulse response $h_{LMS}(k)$ in the LMS algorithm (S9).

FIG. 10 is a flow chart showing a tap gain selection algorithm. The operation will be described below with reference to FIG. 10.

(1) A transmission path impulse response $h_{LS}(k)$ estimated by the LS algorithm processor is acquired (SS1).

(2) The electric power values of $L_1$ tap gains of the transmission path impulse response $h_{LS}(k)$ are calculated (SS2).

(3) The electric power value of each of the $L_1$ tap gains is compared with a predetermined electric power threshold value $P_{th}$ (SS3, SS4).

(4) Only the tap gains each having an electric power value smaller than the electric power threshold value $P_{th}$ are forcibly set to be zero (SS5).

(5) Upon completion of comparison of all the $L_1$ tap gains, the longest non-zero tap gain period is detected from the $L_1$ tap gains (SS6, SS7).

(6) The detected period length is defined to be $L_2$, and a transmission path impulse response constituted by these tap gains in the detected period is determined to be $h_{SEL}(k)$ (SS8).

(7) The transmission path impulse response $h_{SEL}(k)$ is set to be an estimation initial value of the transmission path impulse response $h_{LMS}(k)$ in the LMS algorithm (SS9).

FIG. 11 is a flow chart showing a tap gain selection algorithm. The operation will be described below with reference to FIG. 11.

(1) A transmission path impulse response $h_{LS}(k)$ estimated by the LS algorithm processor is acquired (ST1).

(2) The electric power values of $L_1$ tap gains of the transmission path impulse response $h_{LS}(k)$ are calculated (ST2).

(3) A sum total of the electric power values of the $L_1$ tap gains is calculated (ST3).

(4) The position of a tap having the maximum electric power value is detected from the $L_1$ tap gains, and the detected tap position is stored (ST4).

(5) An electric power value obtained by multiplying the calculated sum total of the electric power values of the $L_1$ tap gains with $\beta$ is set to be $P_{th}$ (ST5).

(6) A finite length window centered at the detected and stored maximum electric power tap gain is assumed, and a sum total of the electric power values of the tap gains located within the finite length window is calculated (ST6, ST7).

(7) The finite length window width is increased until the calculated sum total of the electric power values exceeds $P_{th}$ for the first time, and the finite length window width at that time is stored (STS).

(8) The stored finite length window length is defined to be $L_2$, and a transmission path impulse response constituted by the tap gains in the detected period is set to be $h_{SEL}(k)$ (ST9).

(9) The transmission path impulse response $h_{SEL}(k)$ is set to be an estimation initial value of the transmission path impulse response $h_{LMS}(k)$ in the LMS algorithm (ST10).

The embodiment described above is merely an example for explaining in detail the present invention. The large differences from the conventional MLSE are that the LS algorithm processor free from an initial convergence delay is realized by a small calculation amount in the transmission path impulse response estimation processing unit, and that the tap length of the estimated transmission path impulse response can be automatically changed in correspondence with a transmission path environment.

In the first embodiment described above, digital land mobile communications have been exemplified. However, the present invention is not limited to this, and can also be applied to satellite communications employing a TDMA communication system and wired communications of a fixed network.

The second embodiment of the present invention will be described below with reference to FIGS. 15 to 17.

The transmission path impulse response estimation unit of the above-mentioned MLSE adopts recursive updating type adaptive algorithms for reasons that the calculation amount is small and the initial value of the adaptive algorithm can be unknown. In this case, such an estimation unit does not operate if no known signal sequence is added to a received signal sequence. When an unknown data signal sequence length is prolonged with respect to a known signal sequence length, errors are accumulated in an estimated transmission path impulse response due to an error caused by a distortion occurring on a received signal and incomplete convergence and followability of the adaptive algorithm, and an error between an estimated received signal and an actual received signal gradually increases, resulting in an error in maximum likelihood sequence estimation.

In this manner, the above-mentioned MLSE cannot estimate a received signal unless a known signal sequence is added to a transmission signal sequence, and the known signal sequence must be added to an unknown data signal sequence at a ratio which can satisfy the code error rate performance required for a receiver. As a result, a known signal sequence which is not associated with communication information must be sent, resulting in a decrease in transmission efficiency.

In order to solve these problems, according to the present invention, transmission path impulse response estimation is enabled without adding a known signal sequence to a transmission signal sequence, thus improving transmission efficiency as compared to a conventional system.

In the first arrangement of the second embodiment, since each of the first and second arrangements of the first embodiment comprises the LS algorithm processor in the transmission path impulse response estimation unit, a transmission path impulse response is estimated using the LS algorithm on the basis of all candidate sequences which may be transmitted within a given finite period, and a received signal received during the finite period, and received signal estimation and viterbi algorithm processing are executed using the estimated transmission path impulse response.

In the second arrangement of the second embodiment, an optimal transmission path impulse response is estimated by executing LS algorithm processing and viterbi algorithm processing by periodically using an unknown data signal sequence in the first arrangement.

In the third arrangement of the second embodiment, when a minimum path metric value of the path metrics inherent to the respective states of a state transition diagram in the viterbi algorithm has exceeded a predetermined path metric threshold value as a result of the viterbi algorithm processing using an unknown data signal sequence in the first arrangement, LS algorithm processing and the Viterbi algorithm processing are executed to estimate an optimal transmission path impulse response.

According to the above-mentioned first arrangement of the second embodiment, upon application of the first arrangement of the first embodiment, the viterbi algorithm processing is executed based on a transmission path impulse response which is estimated using the LS algorithm on the basis of all candidate sequences which may be transmitted within a given finite period and a received signal received during the finite period. For this reason, maximum likelihood sequence estimation can be attained without adding a known signal sequence to a received signal sequence.

According to the second arrangement of the second embodiment, upon application of the first arrangement, when no known signal sequence is added to a received signal sequence, even if a transmission path impulse response initial value is determined by the LS algorithm processing and the Viterbi algorithm processing, and maximum likelihood sequence estimation is then performed by the recursive updating type adaptive algorithm, errors caused by various distortions occurring on the received signal are accumulated in the estimated transmission path impulse response. In view of this, by periodically executing the LS algorithm processing and the Viterbi algorithm processing, a transmission path impulse response in which errors are accumulated is discarded, and a new transmission path impulse response initial value can be given. Therefore, even when no known signal sequence is added to the received signal, performance of maximum likelihood sequence estimation can be improved.

According to the third arrangement of the second embodiment, upon application of the first arrangement, when no known signal sequence is added to a received signal sequence, even if a transmission path impulse response initial value is determined by the LS algorithm processing and the viterbi algorithm processing, and maximum likelihood sequence estimation is then performed by the recursive updating type adaptive algorithm, errors caused by distortions occurring on the received 15 signal are immediately accumulated in an estimated transmission path impulse response if transmission path variations have high-speed characteristics, or the amount of additional noise is large. Contrary to this, if the transmission path variations have low-speed characteristics or the amount of additional noise is small, the amount of errors accumulated in the estimated transmission path impulse response is small. For this reason, by executing transmission path impulse response initial value calculations based on the LS algorithm processing with reference to the absolute values of the path metric values inherent to the respective states of the state transition diagram of the viterbi algorithm processor, which values truly express error components included in the estimated transmission path impulse response, an initial value can be set in accordance with the transmission path characteristics, thus improving the performance of maximum likelihood sequence estimation.

The above-mentioned second embodiment will be described in more detail below with reference to FIGS. 15 to 17.

FIG. 15 is a timing chart showing the algorithm operation period when no known signal sequence is added. Assume that a received signal sequence is an unknown data signal sequence stream 1101 to which no known signal sequence is added. During a predetermined period $t_{LS}$ 1103 of this unknown data signal sequence stream 1101, the LS algorithm processor 115 in the transmission path impulse response estimation unit 15 shown in FIG. 1, which is given to explain the MLSE according to the first embodiment of the present invention, is operated. During another predetermined period $t_{LMS}$ 1104 of the unknown data signal sequence stream 1101 shown in FIG. 15, the LMS algorithm processor 116 in the transmission path impulse response estimation unit 15 in FIG. 1 is operated. More specifically, during the LS algorithm operation period $t_{LS}$ 1103 in FIG. 15, the switches 111 and 113 in FIG. 1 are set in an ON state, and the switches 112 and 114 are set in an OFF state. Contrary to this, during the LMS algorithm operation period $t_{LMS}$ in FIG. 15, the switches 112 and 114 in FIG. 1 are set in an ON state, and the switches 111 and 113 are set in an OFF state.

Figure 17:
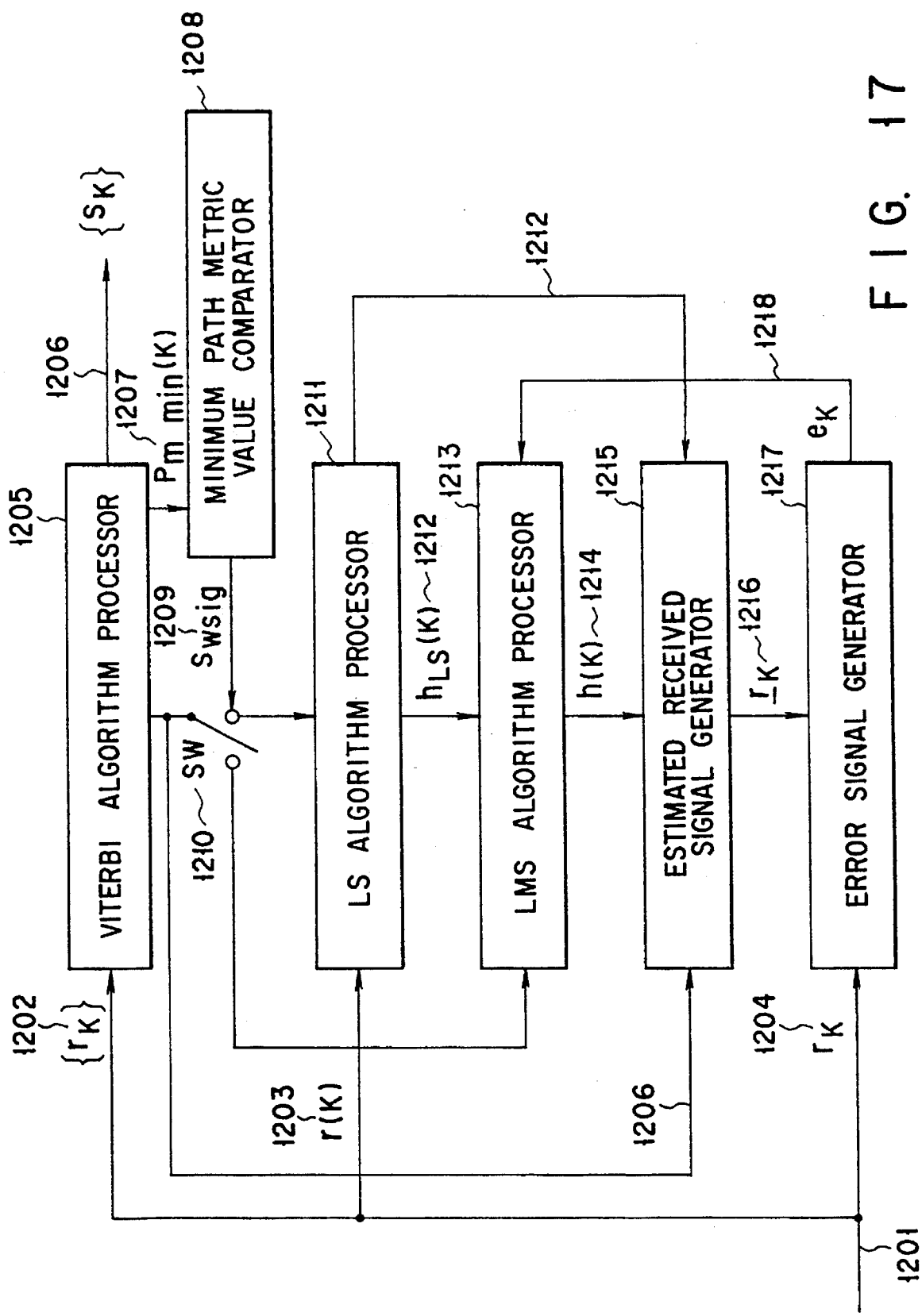
FIG. 17 is a functional block diagram showing the respective functions of the MLSE with the automatic algorithm switching function.

FIG. 17 is a functional block diagram of the MLSE to which an algorithm automatic switching function is added. A Viterbi algorithm processor 1205 shown in FIG. 17 has the same function as that of the Viterbi algorithm processor 14 shown in FIG. 1. That is, the Viterbi algorithm processor 1205 receives a received signal sequence $\{r_k\}$ 1202 from an input terminal 1201 of the MLSE, and outputs a sequence $\{s_k\}$ 1206 which is maximum-likelihood-estimated by viterbi algorithm processing. The viterbi algorithm processor 1205 outputs a minimum value $pm_{min}(k)$ 1207 of path metric values inherent to generation times. The output from the Viterbi algorithm processor 1205 is connected to an LS algorithm processor 1211 or an LMS algorithm processor 1213 via a switch SW 1210. Also, the output from the Viterbi algorithm processor 1205 is always connected to an estimated received signal generator 1215. The minimum path metric value $pm_{min}(k)$ 1207 is supplied to a minimum path metric value comparator 1208. The switch SW 1210 is switched in response to a control signal $sw_{sig}$ 1209 from the minimum path metric value comparator 1208, and its switching timing is defined, as shown in FIG. 16. That is, during only a predetermined period $t_{LS}$ 1305 from the time next to the time at which the minimum path metric value has exceeded a minimum path metric threshold value $pmt_h$ 1304 defined in the minimum path metric value comparator 1208, the switch SW 1210 supplies the maximum-likelihood-estimated sequence $\{s_k\}$ 1206 to the LS algorithm processor 1211. From the time next to the end time of the predetermined period $t_{LS}$ 1305, the switch supplies the maximum-likelihood-estimated sequence $\{s_k\}$ 1206 to the LMS algorithm processor 1213. Periods $t_{TMS1}$, $t_{TMS2}$, $t_{TMS3}$, and $t_{TMS4}$ during which the maximum-likelihood-estimated sequence $\{s_k\}$ 1206 is supplied to the LMS algorithm processor 1213 are periods required until a minimum path metric value at time k to be supplied from the viterbi algorithm processor 1205 to the minimum path metric value comparator 1208 exceeds the predetermined path metric minimum value $pm_{th}$ 1304, and are not constant.

The LS algorithm processor 1211 generates a transmission path impulse response estimated value $h_{LS}(k)$ 1212 on the basis of the sequence $\{s_k\}$ 1206 input from the Viterbi algorithm processor 1205 via the switch SW 1210 and a received signal vector 1203 input from the input terminal 1201 of the MLSE. The generated transmission path impulse response estimated value $h_{LS}(k)$ 1212 is supplied to the LMS algorithm processor 1213 and the estimated received signal generator 1215. The LMS algorithm processor 1213 sequentially generates a transmission path impulse response $h(k)$ 1214 from an error signal $e_k$ 1218 supplied from an error signal generator 1217 and the maximum-likelihood-estimated sequence $\{s_k\}$ 1206 supplied from the viterbi algorithm processor 1205 via the switch SW 1210 using, as an initial value, the transmission path impulse response estimated value $h_{LS}(k)$ 1212 supplied from the LS algorithm processor 1211, and supplies the transmission path impulse response $h(k)$ to the estimated received signal generator 1215. The estimated received signal generator 1215 receives the transmission path impulse responses $h_{LS}(k)$ and $h(k)$ respectively from the LS and LMS algorithm processors 1211 and 1213, and sets in accordance with the algorithm periods shown in FIG. 16, in the tap gains 124, 125, 126, 127, 128, and 129 in the transversal filter in the estimated received signal generator 16 in FIG. 1, $h_{LS}(k)$ during the period $t_{LS}$ 1305 in FIG. 16; and $h(k)$ during each of the periods $t_{TMS1}$, $t_{TMS2}$, $t_{TMS3}$, and $t_{TMS4}$ in FIG. 16.

The transmission signal candidate sequence $\{s_k\}$ supplied from the Viterbi algorithm processor 1205 is subjected to convolution calculations together with the tap gains set in the transversal filter in the estimated received signal generator, thus generating an estimated received signal $\underline{r}_k$ 1216. The generated estimated received signal $\underline{r}_k$ 1216 is supplied to the error signal generator 1217. The error signal generator 1217 generates an error signal $e_k$ 1218 between a received signal $r_k$ 1204 input from the input terminal 1201 of the MLSE and the estimated received signal $\underline{r}_k$ 1216 supplied from the estimated error signal generator 1205, and supplies it to the LMS algorithm processor 1213. The error signal $e_k$ 1218 is utilized in calculations of updating vectors upon execution of recursive updating processing.

According to the first and second arrangements of the second embodiment, even when no known signal sequence is added to a received signal sequence, error components accumulated so far in an estimated transmission path impulse response can be removed by periodically executing the LS algorithm processing and the Viterbi algorithm processing. As a result, an error of maximum likelihood sequence estimation can be suppressed even by using the recursive updating type algorithm, and the performance of the MLSE can be improved.

Each of the first to third arrangements of the second embodiment pays attention to the fact that when distortion components included in a received signal sequence cannot be efficiently removed, the unremoved distortion components, i.e., error components, immediately appear in a path metric value, and the path metric value increases. For this reason, error components accumulated so far in the estimated transmission path impulse response can be appropriately removed. As a result, an error of maximum likelihood sequence estimation can be suppressed even by using the recursive updating type algorithm, and the performance of the MLSE can be improved.

As described above, according to this embodiment, estimation of a transmission path impulse response initial value during a known signal sequence period, which largely influences the operation performance of the MLSE can be more reliably performed, and the calculation amount can be reduced. Therefore, an adaptive maximum likelihood sequence estimator having an initial estimation function which can solve problems associated with the convergence speed and the calculation amount of a conventional recursive updating type adaptive algorithm can be provided.

Also, since a transmission path impulse response can be estimated without adding a known signal sequence to a transmission signal sequence, the transmission efficiency can be improved as compared to the conventional system.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An adaptive maximum likelihood sequence estimation apparatus comprising:

first estimation means for estimating a transmission signal sequence from input received signals and an error signal at time period (k−1);

second estimation means for estimating an estimation received signal at time period k on the basis of a known signal sequence and a transmission path impulse response at time period (k−1) estimated during a period when the known signal sequence is being received, and for estimating an estimation received signal at time period k on the basis of the transmission path impulse response at time period (k−1) estimated during a period when an unknown signal sequence is being received, and the transmission signal sequence estimated by the first estimation means;

error signal generation means for generating the error signal on the basis of the received signal at time period k and the estimation received signals at time period k from said second estimation means; and third estimation means for estimating the transmission path impulse response at time period k using a predetermined adaptive algorithm on the basis of the error signal generated by said error signal generation means, the received signals, and the transmission signal sequence estimated by the first estimation means, wherein said third estimation means comprises means for estimating the transmission path impulse response by a non-recursive calculation during a reception period of the known signal sequence of the received signal, and for estimating the transmission path impulse response by a recursive calculation during a reception period of the unknown signal sequence of the received signals following the known signal sequence period.

2. An apparatus according to claim 1, wherein the non-recursive calculation is an LS (Least Squares) algorithm including a matrix calculation, and LS algorithm processing means for executing the LS algorithm comprises:

memory means for storing matrix data, which is calculated in advance from the known signal sequence to all or partial sequences of which a sequence length determined by a sum of a tap length of a transversal filter for a transmission path impulse response estimation transversal filter and a time window width used in the matrix calculation is assigned; and multiplication means for performing the matrix calculation of the matrix data read out from said memory means and a received signal vector consisting of the received signals corresponding to the known signal sequence used in the calculation of the matrix.

3. An apparatus according to claim 2, wherein said third estimation means comprises means for estimating the transmission path impulse response by setting the number $L_1$ of taps of an estimated transmission path impulse response obtained by the LS algorithm during the reception period of the known signal sequence to be larger than the number $L_2$ of taps of an estimated transmission path impulse response during the reception period of the unknown signal sequence.

4. An apparatus according to claim 3, wherein said third estimation means comprises: calculation means for calculating a power value of each of $L_1$ taps of the transmission path impulse response estimated during the reception period of the known signal sequence; and selection means for selecting a combination corresponding to a maximum sum total of the power values of continuous $L_2$ taps from the $L_1$ taps, and sets a transmission path impulse response having the selected continuous $L_2$ taps as an estimation initial value.

5. An apparatus according to claim 3, wherein said third estimation means comprises: calculation means for calculating a power value of each of $L_1$ taps of the transmission path impulse response estimated during the reception period of the known signal sequence; and selection means for selecting continuous taps each having a power value larger than a predetermined threshold value from the $L_1$ taps, and sets the number of selected taps to be the number $L_2$ of taps of the transmission path impulse response estimation transversal filter during the reception period of the unknown signal sequence.

6. An apparatus according to claim 3, wherein said third estimation means comprises: calculation means for calculating a power value of each of $L_1$ taps of the transmission path impulse response estimated during the reception period of the known signal sequence; and selection means for selecting continuous taps, a sum total of the power values of which becomes larger than a threshold value of the power of the transmission path impulse response, which threshold value is determined in advance with respect to a sum total of the power values of the $L_1$ taps, and sets the number of selected taps to be the number $L_2$ of taps of the transmission path impulse response estimation transversal filter during the reception period of the unknown signal sequence.

7. An apparatus according to claim 1, wherein an estimation delay caused by estimation using the non-recursive calculation is equal to an estimation delay caused by estimation using the recursive calculation.

8. An adaptive maximum likelihood sequence estimation method comprising:

a first estimation step of estimating a transmission signal sequence from input received signals and an error signal at time period (k−1);

a second estimation step for estimating an estimation received signal at time period k on the basis of a known signal sequence and a transmission path impulse response at time period (k−1) estimated during a period when the known signal sequence is being received, and for estimating an estimation received signal at time period k on the basis of the transmission path impulse response at time period (k−1) estimated during a period when an unknown signal sequence is being received, and the transmission signal sequence estimated by the first estimation means;

an error signal generation step of generating the error signal on the basis of the received signals at time period k and the estimation received signals at time period k; and a third estimation step of estimating the transmission path impulse response at time period k using a predetermined adaptive algorithm on the basis of the error signal generated in the error signal generation step, the received signals, and the transmission signal sequence estimated by the first estimation step, wherein the third estimation step comprises the step of estimating the transmission path impulse response by a non-recursive calculation during a reception period of the known signal sequence of the received signals, and of estimating the transmission path impulse response by a recursive calculation during a reception period of the unknown signal sequence of the received signals following the known signal sequence period.

9. A method according to claim 8, wherein the non-recursive calculation is an LS (Least Squares) algorithm including a matrix calculation, and the LS algorithm processing step of executing the LS algorithm comprises:

a storing step of storing matrix data, which is calculated in advance from the known signal sequence to all or partial sequences of which a sequence length determined by a sum of a tap length of a transversal filter for a transmission path impulse response estimation transversal filter and a time window width used in the matrix calculation is assigned; and a multiplication step of performing the matrix calculation of the read out matrix data and a received signal vector consisting of the received signals corresponding to the known signal sequence used in the calculation of the matrix.

10. A method according to claim 9, wherein the third estimation step comprises the step of estimating the transmission path impulse response by setting the number $L_1$ of taps of an estimated transmission path impulse response obtained by the LS algorithm during the reception period of the known signal sequence to be larger than the number $L_2$ of taps of an estimated transmission path impulse response during the reception period of the unknown signal sequence.

11. A method according to claim 10, wherein the third estimation step comprises: the calculation step of calculating a power value of each of $L_1$ taps of the transmission path impulse response estimated during the reception period of the known signal sequence; and the selection step of selecting a combination corresponding to a maximum sum total of the power values of continuous $L_2$ taps from the $L_1$ taps, and a transmission path impulse response having the selected continuous $L_2$ taps is set as an estimation initial value.

12. A method according to claim 10, wherein the third estimation step comprises: the calculation step of calculating a power value of each of $L_1$ taps of the transmission path impulse response estimated during the reception period of the known signal sequence; and the selection step of selecting continuous taps each having a power value larger than a predetermined threshold value from the $L_1$ taps, and the number of selected taps is set to be the number $L_2$ of taps of the transmission path impulse response estimation transversal filter during the reception period of the unknown signal sequence.

13. A method according to claim 10, wherein the third estimation step comprises: the calculation step of calculating a power value of each of $L_1$ taps of the transmission path impulse response estimated during the reception period of the known signal sequence; and the selection step of selecting continuous taps, a sum total of the power values of which becomes larger than a threshold value of the power of the transmission path impulse response, which threshold value is determined in advance with respect to a sum total of the power values of the $L_1$ taps, and the number of selected taps is set to be the number $L_2$ of taps of the transmission path impulse response estimation transversal filter during the reception period of the unknown signal sequence.

14. A method according to claim 8, wherein an estimation delay caused by estimation using the non-recursive calculation is equal to an estimation delay caused by estimation using the recursive calculation.

* * * * *